(12) United States Patent
Goto et al.

(10) Patent No.: US 6,823,745 B2
(45) Date of Patent: Nov. 30, 2004

(54) RELATIVE-ROTATIONAL-POSITION DETECTION APPARATUS

(75) Inventors: Atsutoshi Goto, Fuchu (JP); Kazuya Sakamoto, Hamura (JP); Hiroshi Sakamoto, Kawagoe (JP)

(73) Assignee: Amiteq Co., Ltd. (JP)

( * ) Notice: Subject to any disclaimer, the term of this patent is extended or adjusted under 35 U.S.C. 154(b) by 0 days.

(21) Appl. No.: 10/430,146

(22) Filed: May 6, 2003

(65) Prior Publication Data

US 2003/0196496 A1 Oct. 23, 2003

Related U.S. Application Data

(63) Continuation-in-part of application No. 10/121,001, filed on Apr. 11, 2002, now Pat. No. 6,581,479.

(51) Int. Cl.⁷ .................................................. G01L 3/10
(52) U.S. Cl. ............................ 73/862.331; 73/862.333; 73/862.335
(58) Field of Search .................... 73/862.331, 862.333, 73/862.335; 324/207.16, 207.19

(56) References Cited

U.S. PATENT DOCUMENTS 6,581,479 B2 * 6/2003 Goto et al. ............ 73/862.331

* cited by examiner

Primary Examiner—Edward Lefkowitz
Assistant Examiner—Jermaine Jenkins
(74) Attorney, Agent, or Firm—Rossi & Associates

(57) ABSTRACT

An outer cylindrical section is rotatable with a first shaft. Magnetic shielding portions are formed of a magnetic shielding or antimagnetic substance and arranged on a surface of a nonmagnetic and nonconductive cylindrical base. The magnetic shielding portions are spaced apart from each other by a predetermined interval in a circumferential direction of the cylindrical base so that non-magnetically-shielding portions are formed between the magnetic shielding portions. A plurality of coils are provided on a periphery of the outer cylindrical section and excitable by a predetermined A.C. signal. An inner cylindrical section is inserted in the outer cylindrical section and rotatable with a second shaft. The inner cylindrical section includes magnetic portions each provided to present a different characteristic with respect to an arrangement of the plurality of coils. Degree of overlap between the non-magnetically-shielding portions of the outer cylindrical section and the magnetic portions of the inner cylindrical section varies in response to a variation in the relative rotational position between the first shaft and the second shaft, and each of the coils presents impedance corresponding to the degree of overlap.

9 Claims, 14 Drawing Sheets

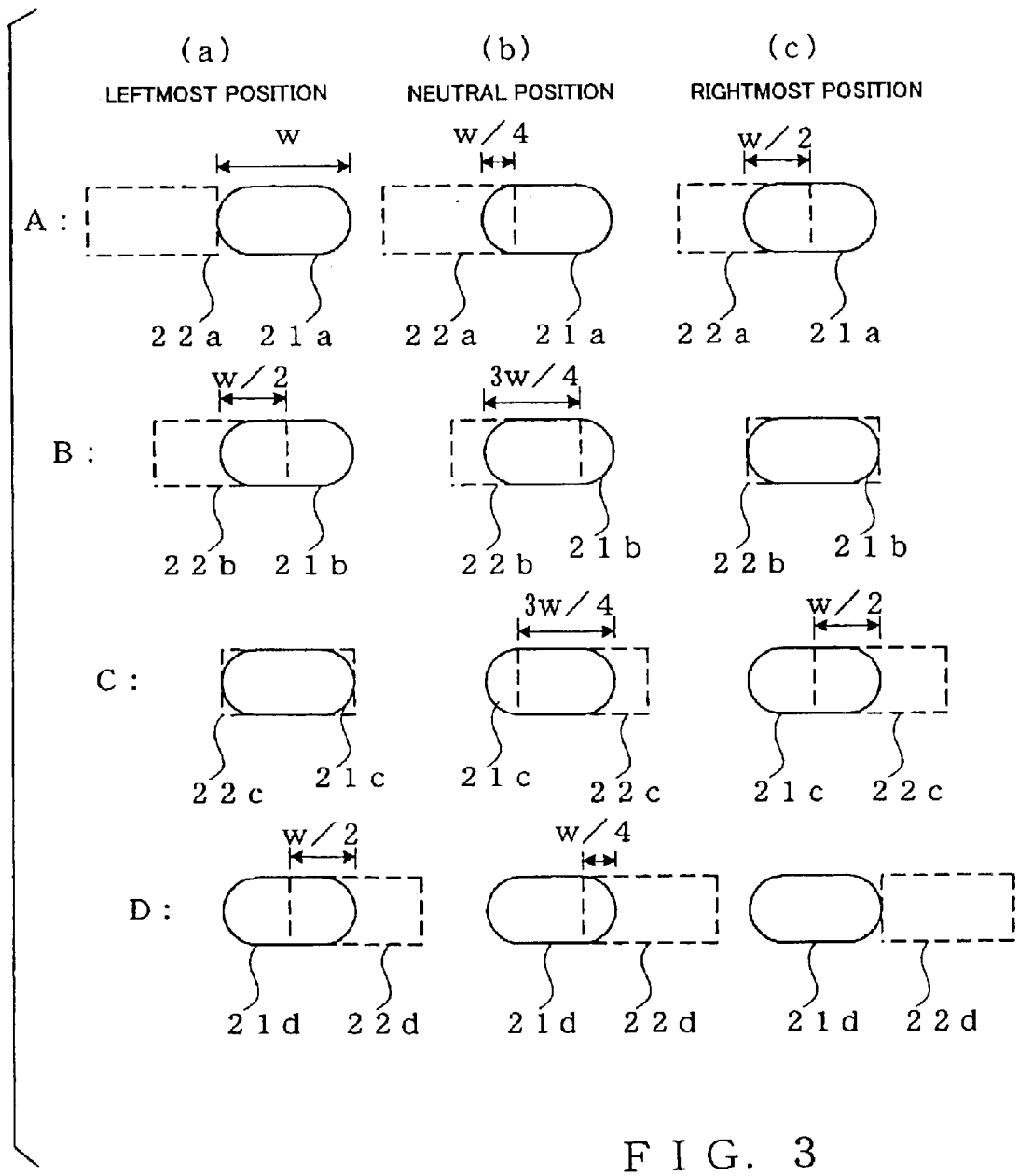
F I G. 3

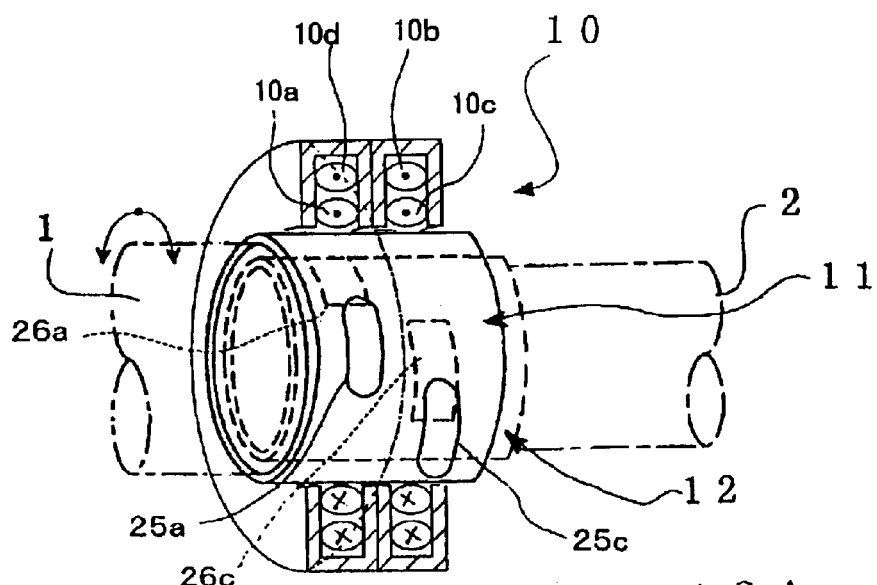
FIG. 13A
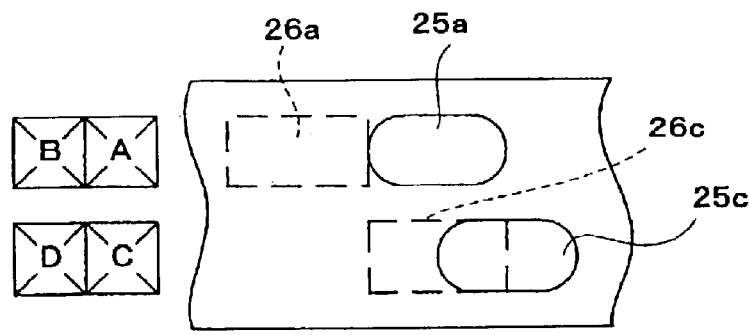
FIG. 13B
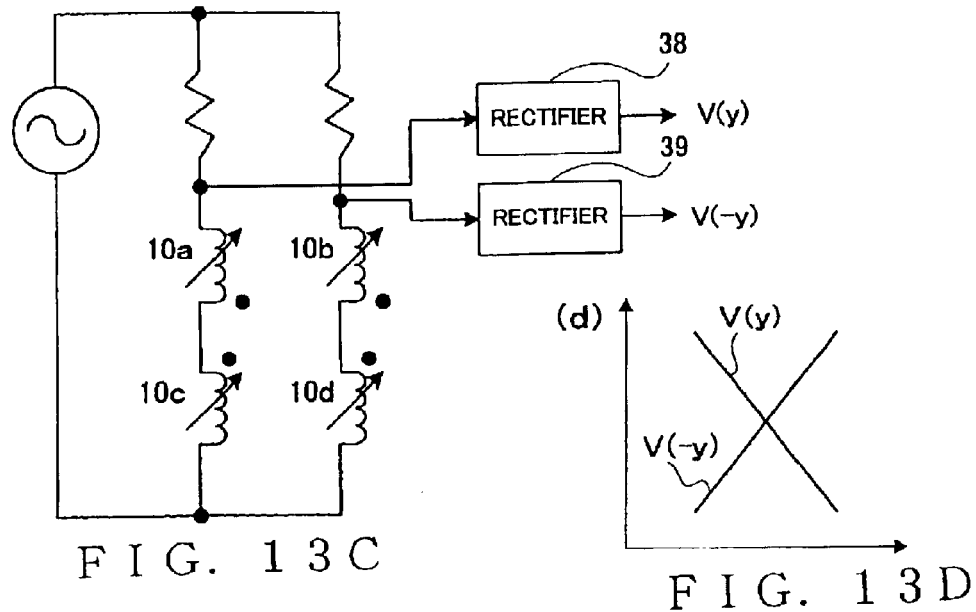
FIG. 13C
FIG. 13D

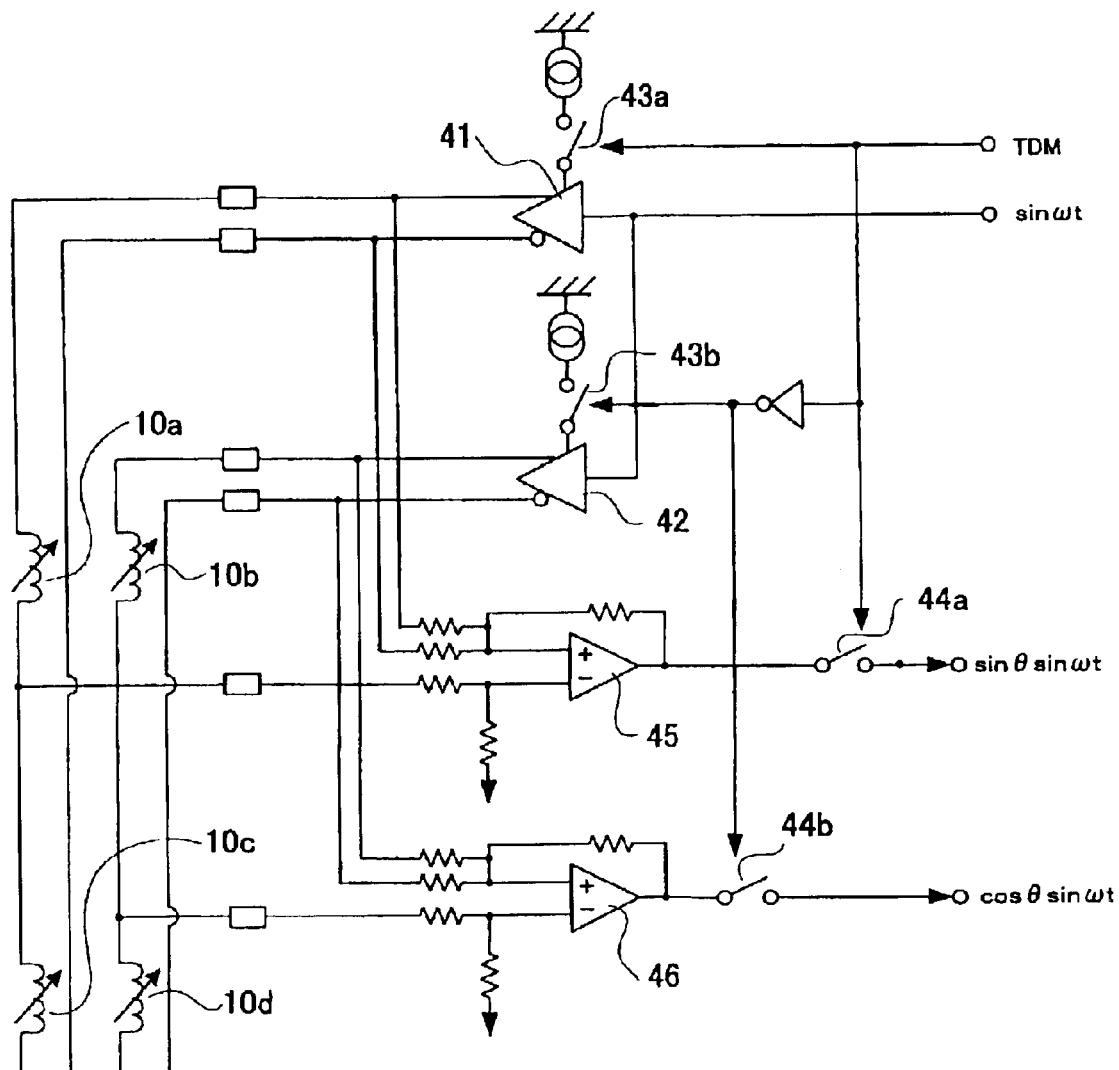
F I G. 14

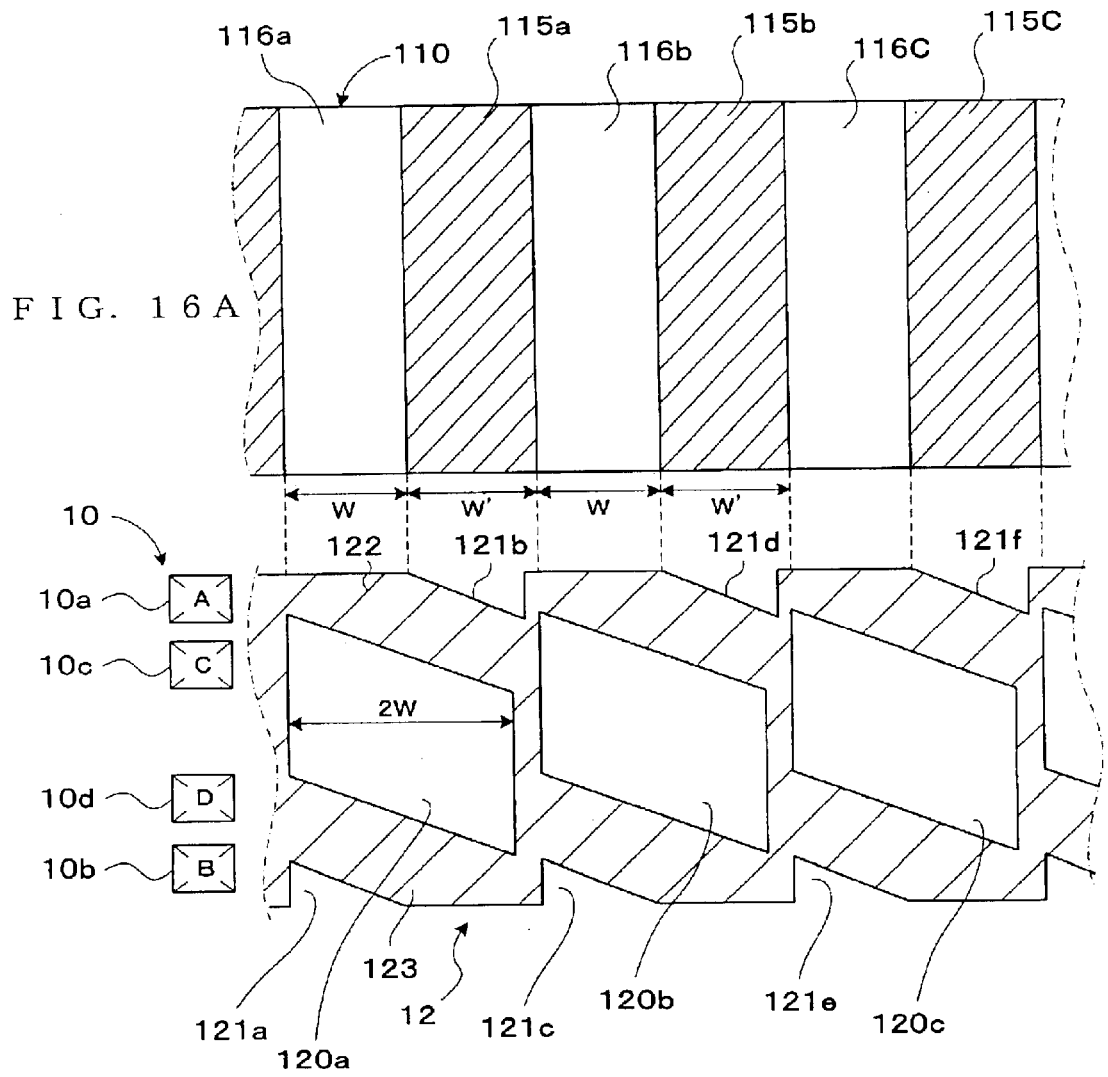

US 6,823,745 B2

RELATIVE-ROTATIONAL-POSITION DETECTION APPARATUS

RELATED APPLICATION

The present application is a continuation-in-part application of U.S. patent application Ser. No. 10/121,001 filed Apr. 11, 2002 under the title of "Relative-Rotational-Position Detection Apparatus", which is U.S. Pat. No. 6,581,479.

BACKGROUND OF THE INVENTION

The present invention relates to an improved apparatus for detecting a relative rotational position between two shafts, which is suitable for use as, for example, a torque sensor for detecting a torsional force or load applied to a power steering shaft of a motor vehicle.

Of various types of techniques for detecting torsional amounts of two relatively rotatable shafts, there have been well known those which are characterized by provision of detection devices, such as a potentiometer or resolver devices, on input and output shafts interconnected via a torsion bar. According to the above-mentioned technique using a potentiometer, a slider is mounted on the input shaft while a resistor is mounted on the output shaft, so that a position of the slider contacting the resistor varies in accordance with a variation in a relative rotational position between the input and output shafts to thereby provide an analog voltage corresponding to the relative rotational position. According to the technique using resolver devices, separate resolver devices are provided on both of the input and output shafts so as to detect a relative rotational amount (torsional amount) between the two shafts on the basis of angle signals produced by the two resolver devices. Further, as a means for detecting a relative rotational displacement between two relatively rotatable shafts, there has been developed a noncontact-type torque sensor for electronic power steering which employs an induction coil.

The conventional technique of the type using a potentiometer would always suffer from poor electrical contact, failure and/or other problem since the electrical contact is implemented via a mechanical contact structure. Further, because there occurs impedance variations due to temperature changes, it is necessary to appropriately compensate for a temperature drift. Further, the rotational-displacement detection apparatus, known as the noncontact-type torque sensor for electric power steering employing the induction coil, is arranged to measure an analog voltage level produced in response to a minute relative rotational displacement, so that it only accomplishes a very poor detecting resolution. Further, in addition to the need to compensate temperature drift characteristics of the coil, there is a need to appropriately compensate temperature drift characteristics present in reluctance of magnetic substances that vary magnetic coupling to the coil in response to a changing relative rotational position as well as in eddy current loss of electrically conductive substances. Furthermore, it is desirable that the torque sensors for motor vehicles be arranged as a dual-sensing structure for safety purposes.

SUMMARY OF THE INVENTION

It is therefore an object of the present invention to provide a relative-rotational-position detection apparatus which can achieve superior temperature-characteristic compensating performance and can be easily arranged as a dual-sensing structure.

It is another object of the present invention to provide a relative-rotational-position detection apparatus which is capable of high-resolution detection even when a relative rotational displacement to be detected is very minute.

According to an aspect of the present invention, there is provided a relative-rotational-position detection apparatus for detecting a relative rotational position between a first shaft and a second shaft rotatable relative to each other, which comprises: an outer cylindrical section rotatable with the first shaft, the outer cylindrical having a nonmagnetic and nonconductive cylindrical base and magnetic shielding portions formed of a magnetic shielding or antimagnetic substance and arranged on a surface of the cylindrical base, the magnetic shielding portions being spaced apart from each other by a predetermined interval in a circumferential direction of the cylindrical base so that non-magnetically-shielding portions are formed between the magnetic shielding portions; a plurality of coils provided on a periphery of the outer cylindrical section and excitable by a predetermined A.C. signal; and an inner cylindrical section inserted in the outer cylindrical section and rotatable with the second shaft, the inner cylindrical section including magnetic portions each provided to present a different characteristic with respect to an arrangement of the plurality of coils. Here, in response to a variation in a relative rotational position between the first shaft and the second shaft, a degree of overlap between the non-magnetically-shielding portions of the outer cylindrical section and the magnetic portions of the inner cylindrical section varies, and each of the coils presents impedance corresponding to the degree of overlap.

The relative-rotational-position detection apparatus of the present invention is extremely useful in that it permits accurate detection by appropriately compensating temperature drift characteristics and in that it can be constructed to provide dual detection outputs.

While the described embodiments represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its embodiments will be described in greater detail hereinbelow with reference to the accompanying drawings, in which:

FIG. 3 is a diagram showing correlations between the windows of the outer and inner cylindrical sections in corresponding relation to different relative rotational positions;

FIG. 13A is a partly-sectional perspective view showing a modification of the embodiment of FIG. 11, which is characterized by a two-track construction;

FIG. 13B is a schematic developed view showing another example of the track-by-track window arrangement patterns of FIG. 13A;

FIG. 13C is a circuit diagram of the relative-rotational-position detection apparatus of FIG. 13A;

FIG. 13D is a graph explanatory of operation of the apparatus shown in FIG. 13A;

FIG. 14 is a circuit diagram showing a relative-rotational-position detection apparatus in accordance with a fourth embodiment of the present invention where a time-divisional excitation scheme is employed;

FIG. 16A is a schematic developed view of an outer cylindrical section in still another embodiment of the present invention, and FIG. 16B is a schematic developed view of an inner cylindrical section corresponding to the outer cylindrical section.

Figure 1:
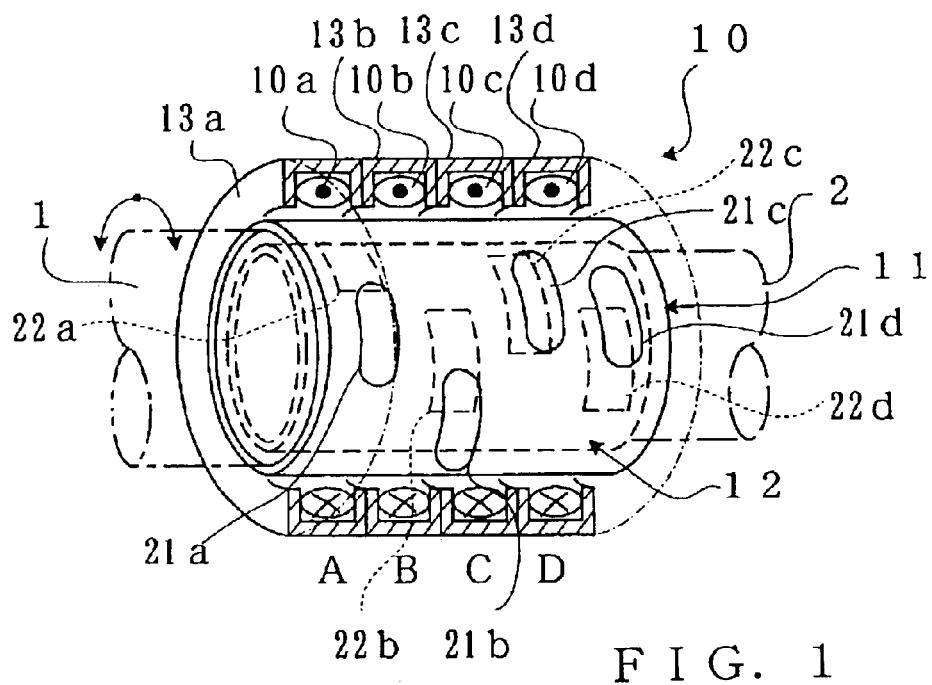
FIG. 1 is a partly-sectional perspective view showing a relative-rotational-position detection apparatus in accordance with a first embodiment of the present invention.

DETAILED DESCRIPTION OF THE INVENTION (1) Construction of First Embodiment:

FIG. 1 is a partly-sectional perspective view showing a relative-rotational-position detection apparatus in accordance with a first embodiment of the present invention. As shown, the relative-rotational-position detection apparatus comprises an outer cylindrical section 11, an inner cylindrical section 12 inserted in the outer cylindrical section 11, in a noncontact fashion, with an annular gap interposed between the cylindrical sections 11 and 12, and a coil section 10 disposed around the outer periphery of the outer cylindrical section 11, in a noncontact fashion, with an annular gap interposed between the coil section 10 and the outer cylindrical section 11. The coil section 10 includes four coils 10a, 10b, 10c and 10d in corresponding relation to four tracks (or detecting channels) that are in the form of windows formed in the outer and inner cylindrical sections 11 and 12. In the first embodiment, the outer cylindrical section 11 is disposed within a cylindrical space defined by the inner surfaces of the 10a, 10b, 10c and 10d, so that magnetic flux is produced in an axial direction of the outer and inner cylindrical sections 11 and 12. In FIG. 1, the individual coils 10a–10d are shown in section.

The outer cylindrical section 11 is connected to one of relatively-rotatable first and second shafts 1 and 2 (e.g., first shaft 1) for rotation with the one shaft 1, while the inner cylindrical section 12 is connected to the other of the first and second shafts 1 and 2 (e.g., second shaft 2) for rotation with the other shaft 2. For example, the first and second shafts 1 and 2 are connected with each other via a torsion bar (not shown), and these shafts 1 and 2 are rotatable relative to each other within a limited angular range permitted by a possible torsional deformation of the torsion bar. Construction of these two shafts (input and output shafts) interconnected via the torsion bar is conventionally known per se, for example, in the field of power steering mechanisms of motor vehicles, and the relative-rotational-position detection apparatus of the invention described herein can be suitably used as a torque sensor for detecting torque applied to the torsion bar of the power steering mechanism.

Figure 2:
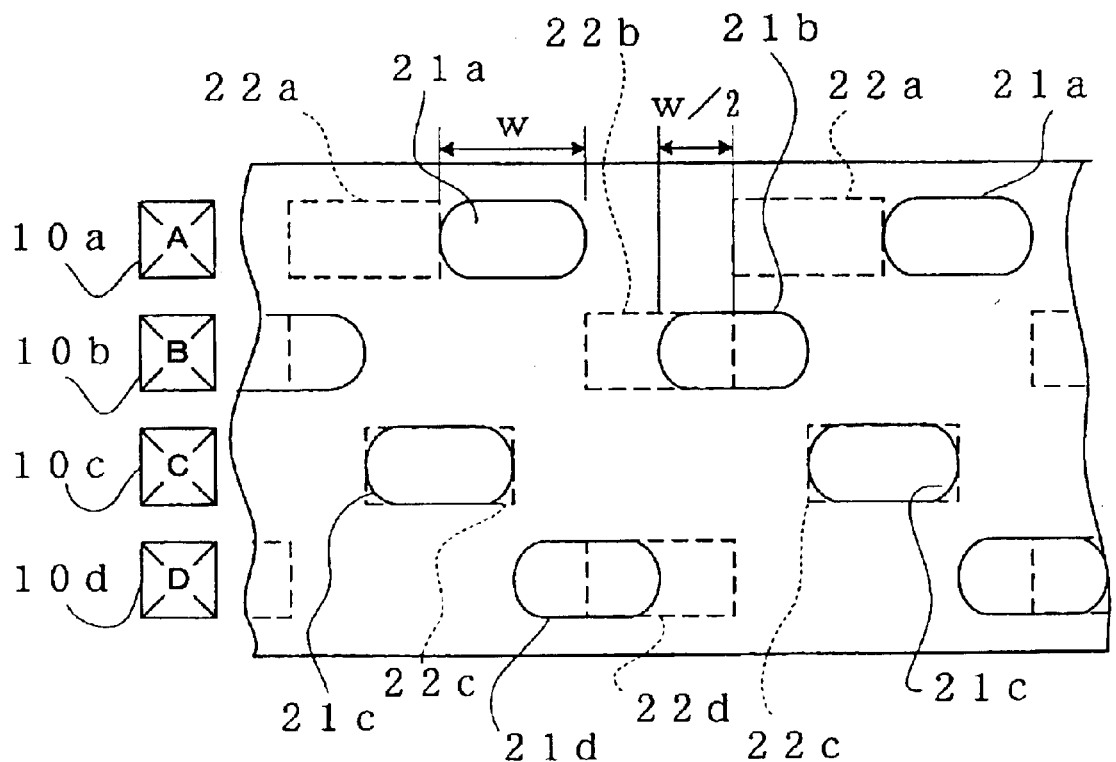
FIG. 2 is a schematic developed view showing exemplary arrangement patterns of open windows in an outer cylindrical section and nonmagnetic windows in an inner cylindrical section which correspond to a plurality of tracks.

The outer cylindrical section 11 is formed of a metal material, having magnetic shielding (antimagnetic or diamagnetic) property, into a cylinder having a small wall thickness. For example, the metal substance may be a nonmagnetic but highly electrically conductive substance such as copper, aluminum, brass or nonmagnetic stainless steel. The outer cylindrical section 11 has four rows (four tracks) of open windows 21a, 21b, 21c and 21d which extend in a circumferential direction thereof. As illustratively shown in a developed view of FIG. 2, each of the rows (tracks), which are spaced from each other in an axial direction of the cylindrical section 11, consists of a plurality of open windows 21a, 21b, 21c and 21d circumferentially spaced from each other at predetermined intervals. Note, however, that each of the rows (tracks) may consist of only one such open window.

The inner cylindrical section 12 is formed of a magnetic substance, such as a ferromagnetic substance like iron or ferrite, into a cylinder having an appropriately great wall thickness. The inner cylindrical section 12 has four rows of nonmagnetic windows 22a, 22b, 22c and 22d formed in predetermined positions thereof in corresponding relation to the four rows (tracks) of the open windows 21a, 21b, 21c and 21d. For example, the nonmagnetic windows 22a, 22b, 22c and 22d are open windows formed in the body of the inner cylindrical section 12 made of the magnetic substance. However, the nonmagnetic windows 22a, 22b, 22c and 22d may be in the form of windows made of a metal material having magnetic shielding or antimagnetic, i.e. diamagnetic, property, rather than the open windows. As illustratively shown in the developed view of FIG. 2, each of the rows (tracks) consists of a plurality of nonmagnetic windows 22a, 22b, 22c or 22d circumferentially spaced from each other at predetermined intervals. The predetermined intervals need not necessarily be uniform; it is only necessary that correlations between the open windows in the outer cylindrical section 11 and the nonmagnetic windows in the inner cylindrical section 12 satisfy predetermined track-by-track relational conditions as will be later described. Note that if the outer cylindrical section 11 has only one open window 21a, 21b, 21c or 21d per row, then the inner cylindrical section 12 may have only one nonmagnetic window 22a, 22b, 22c or 22d corresponding to the open window of the outer cylindrical section 11.

The circumference along which the open windows 21a are formed in the outer cylindrical section 11 overlaps the circumference along which the nonmagnetic window 22a are formed in the inner cylindrical section 12, so that the windows 21a of the outer cylindrical section 11 and nonmagnetic windows 22a of the inner cylindrical section 12 together constitute a track (hereinafter referred to as "track A" for convenience of description). The coil 10a is positioned in such a manner as to surround the circumference of track A. The circumference along which the open windows 21b are formed in the outer cylindrical section 11 overlaps the circumference along which the nonmagnetic window 22b are formed in the inner cylindrical section 12, so that the open windows 21b of the outer cylindrical section 11 and nonmagnetic windows 22b of the inner cylindrical section 12 together constitute another track (hereinafter referred to as "track B"). The coil 10b is positioned in such a manner as to surround the circumference of track B. The circumference along which the open windows 21c are formed in the outer cylindrical section 11 overlaps the circumference along which the nonmagnetic window 22c are formed in the inner cylindrical section 12, so that the open windows 21c of the outer cylindrical section 11 and nonmagnetic windows 22c of the inner cylindrical section 12 together constitute still another track (hereinafter referred to as "track C"). The coil 10c is positioned in such a manner as to surround the circumference of track C. Further, the circumference along which the open windows 21d are formed in the outer cylindrical section 11 overlaps the circumference along which the nonmagnetic window 22d are formed in the inner cylindrical section 12, so that the open windows 21d of the outer cylindrical section 11 and nonmagnetic windows 22d of the inner cylindrical section 12 together constitute yet another track (hereinafter referred to as "track D"). The coil 10d is positioned in such a manner as to surround the circumference of track D. The coils 10a to 10d are accommodated in magnetic or antimagnetic cases 13a to 13d, respectively, so that a magnetic field produced by each of the coils 10a to 10d does not affect the other coils.

Because of the magnetic shielding (antimagnetic) property of the outer cylindrical section 11, degree of the overlap between the open windows 21a to 21d of the outer cylindrical section 11 and the nonmagnetic windows 22a to 22d of the inner cylindrical section 12 determine impedance of the respective coils 10a to 10d. Namely, for each of the tracks, an amount of exposure, to the open windows of the overlying outer cylindrical section 11, of the magnetic substance of the inner cylindrical section 12 determines the inductance, i.e. impedance, of the corresponding coil. For example, when the nonmagnetic windows 22a of the inner cylindrical section 12 are fully overlapping the open windows 21 of the outer cylindrical section 11 on track A, the corresponding coil 10a presents the smallest inductance or impedance. When the nonmagnetic windows 22a of the inner cylindrical section 12 are not even slightly overlapping the open windows 21 of the outer cylindrical section 11, i.e. when the magnetic substance of the inner cylindrical section 12 is fully exposed to the open windows of the outer cylindrical section 11, the coil 10a presents the greatest inductance or impedance. Further, when the nonmagnetic windows 22a of the inner cylindrical section 12 are each overlapping just one-half of the area of the corresponding open window of the outer cylindrical section 11, i.e. when the magnetic substance of the inner cylindrical section 12 is exposed to one-half of the area of each of the open windows 21a, the coil 10a presents a mid impedance value between the greatest and smallest values of inductance or impedance. Thus, the inductance or impedance of the coil 10a varies between the greatest and smallest values depending on the degree to which the nonmagnetic windows 22a of the inner cylindrical section 12 overlap the open windows 21 of the outer cylindrical section 11. The degree of the overlap between the nonmagnetic windows 22a of the inner cylindrical section 12 and the open windows 21 of the outer cylindrical section 11 corresponds to a relative rotational position between the first and second shafts 1 and 2 that is an object of detection here, and thus the inductance or impedance of the coil 10a presents a value corresponding to a relative rotational position to be detected.

Relationships between the open windows 21b to 21d of the outer cylindrical section 11 and the nonmagnetic windows 22b to 22d of the inner cylindrical section 12 on other tracks B–D are the same as described above for track A; namely, the open windows 21b to 21d and the nonmagnetic windows 22b to 22d are positioned in such a manner that the inductance or impedance of the corresponding coils 10b to 10d presents values corresponding to a relative rotational position to be detected.

Namely, the embodiment is constructed in such a manner that the degree of the overlap between the open windows 21a to 21d of the outer cylindrical section 11 and the nonmagnetic windows 22a to 22d of the inner cylindrical section 12 on tracks A to D vary with predetermined phase differences from a relative rotational position to be detected.

FIG. 3 is a diagram showing correlations between the windows of the outer and inner cylindrical sections 11 and 12 on tracks A to D. Specifically, in this figure, (b) shows correlations between the windows on tracks A to D when the relative rotational position of the first and second shafts 1 and 2 is "0", i.e. neutral. Note that the relative rotational position moves from the neutral position leftward and rightward (in clockwise and counterclockwise directions) within a predetermined range. (a) shows correlations between the windows on tracks A to D when the relative rotational position of the first and second shafts 1 and 2 is leftmost, and (c) shows correlations between the windows on tracks A to D when the relative rotational position of the first and second shafts 1 and 2 is rightmost.

In the instant embodiment, the first and second shafts 1 and 2 can rotate relative to each other within a range corresponding to about half of a circumferential length w of each one of the open windows 21a to 21d of the outer cylindrical section 11 or each one of the nonmagnetic windows 22a to 22d of the inner cylindrical section 12. Namely, referring to track A, the open windows 21a of the outer cylindrical section 11 and the nonmagnetic windows 22a of the inner cylindrical section 12 do not overlap with each other at all in the leftmost relative position as shown in (a) of FIG. 3, so that the coil 10a presents maximum impedance in the leftmost relative position. In the neutral relative position shown in (b), each of the nonmagnetic windows 22a of the inner cylindrical section 12 overlaps with the corresponding open window 21a of the outer cylindrical section 11 by an amount corresponding to about w/4 (one-quarter of the circumferential length w). In the rightmost relative position shown in (c), each of the nonmagnetic windows 22a of the inner cylindrical section 12 overlaps with the corresponding open window 21a of the outer cylindrical section 11 by an amount corresponding to about w/2.

In the case of track B, each of the nonmagnetic windows 22b of the inner cylindrical section 12 overlaps with the corresponding open window 21b of the outer cylindrical section 11 by an amount corresponding to about w/2 in the leftmost relative position shown in (a) of FIG. 3. In the neutral relative position shown in (b), each of the nonmagnetic windows 22b of the inner cylindrical section 12 overlaps with the corresponding open window 21b of the outer cylindrical section 11 by an amount corresponding to about 3w/4. In the rightmost relative position shown in (c), the open windows 21b of the outer cylindrical section 11 and the nonmagnetic windows 22b of the inner cylindrical section 12 fully overlap with each other.

In the case of track C, the open windows 21c of the outer cylindrical section 11 and the nonmagnetic windows 22c of the inner cylindrical section 12 completely overlap with each other in the leftmost relative position shown in (a) of FIG. 3. In the neutral relative position shown in (b), each of the nonmagnetic windows 22c of the inner cylindrical section 12 overlaps with the corresponding open window 21c of the outer cylindrical section 11 by an amount corresponding to about w/4. In the rightmost relative position shown in (c), each of the nonmagnetic windows 22c of the inner cylindrical section 12 overlaps with the corresponding open window 21c of the outer cylindrical section 11 by an amount corresponding to about w/2.

Further, in the case of track D, each of the nonmagnetic windows 22d of the inner cylindrical section 12 overlaps with the corresponding open window 21d of the outer cylindrical section 11 by an amount corresponding to about w/2 in the leftmost relative position shown in (a) of FIG. 3. In the neutral relative position shown in (b), each of the nonmagnetic windows 22d of the inner cylindrical section 12 overlaps with the corresponding open window 21d of the outer cylindrical section 11 by an amount corresponding to about w/4. In the rightmost relative position shown in (c), the open windows 21d of the outer cylindrical section 11 and the nonmagnetic windows 22d of the inner cylindrical section 12 do not even slightly overlap with each other.

As clear from the foregoing, a variation in the degree of the overlap between the open windows 21c and the nonmagnetic windows 22c on track C with respect to a relative position between the shafts 1 and 2 are in opposite phase or differential with respect to a variation in the degree of the overlap between the open windows 21 a and the nonmagnetic windows 22a on track A. Similarly, a variation in the degree of the overlap between the open windows 21d and the nonmagnetic windows 22d on track D with respect to a relative position between the shafts 1 and 2 are in opposite phase or differential with respect to a variation in the degree of the overlap between the open windows 21b and the nonmagnetic windows 22b on track B. Further, a variation in the degree of the overlap between the open windows 21b and the nonmagnetic windows 22b on track A with respect to a relative position between the shafts 1 and 2 present a difference of one-quarter cycle (electrical angle of 90 degrees) from a variation in the degree of the overlap between the open windows 21 a and the nonmagnetic windows 22a on track A.

For example, the shape of the open windows 21a and nonmagnetic windows 22a on track A may be chosen or set appropriately such that the impedance produced in the coil 10a corresponding to track A presents a variation over a one-quarter-cycle range of a sine (or cosine) function as the first and second shafts 1 and 2 displace relative to each other over a length of about w/2 from the leftmost relative position of the windows 21a and 22a on track A to the rightmost relative position. In the illustrated example, the open windows 21 a of the outer cylindrical section 11 each have a roundish shape with no sharp corners while the nonmagnetic windows 22d of the inner cylindrical section 12 each have a rectangular shape; however, it should be obvious that the shapes of the open windows and nonmagnetic windows are not so limited.

If an angular variable corresponding to a relative rotational position between the first and second shafts 1 and 2 is represented by θ, an impedance variation A(θ) of an ideal sine function characteristic occurring in the coil boa corresponding to track A can be expressed equivalently by the following mathematical expression:

$$A(\theta)=P_0+P \sin \theta$$

Because the impedance variation does not take a negative value (does not enter a negative value region), the offset value $P_0$ is equal to or greater than the amplitude coefficient $P(P_0 \geq P)$, and "$P_0+P \sin \theta$" does not take a negative value in the mathematical expression above. Here, the angular variable θ correlates to or changes in proportion to a relative rotational position to be detected, with such a relationship that the length w/2, corresponding to the variation range of the overlap between the windows 21a and 22a, corresponds to phase angle π/2. Because the maximum displacement range is w/2, it is assumed here that the angular variable e changes only within a range of 0–π/2 or about 90° electrical angle.

By contrast, an ideal impedance variation C(θ) occurring in the coil 10c corresponding to track C that presents a differential variation to the variation on track A can be expressed equivalently by the following mathematical expression of a minus sine function characteristic:

$$C(\theta)=P_0-P \sin \theta$$

Further, an ideal impedance variation B(θ) occurring in the coil 10b corresponding to track B that presents a difference of a one-quarter cycle (π/2 electrical angle) from the variation on track A can be expressed equivalently by the following mathematical expression of a cosine function characteristic:

$$B(\theta)=P_0+P \cos \theta$$

Furthermore, an ideal impedance variation D(θ) occurring in the coil 10d corresponding to track D that presents a differential variation to the variation on track B can be expressed equivalently by the following mathematical expression of a minus cosine function characteristic:

$$D(\theta)=P_0-P \cos \theta$$

The amplitude coefficient P will be omitted from the following description, because it may be regarded as a value "1

" and the omission of the coefficient P does not appear to cause any inconvenience in the description of the invention.

Figure 4:
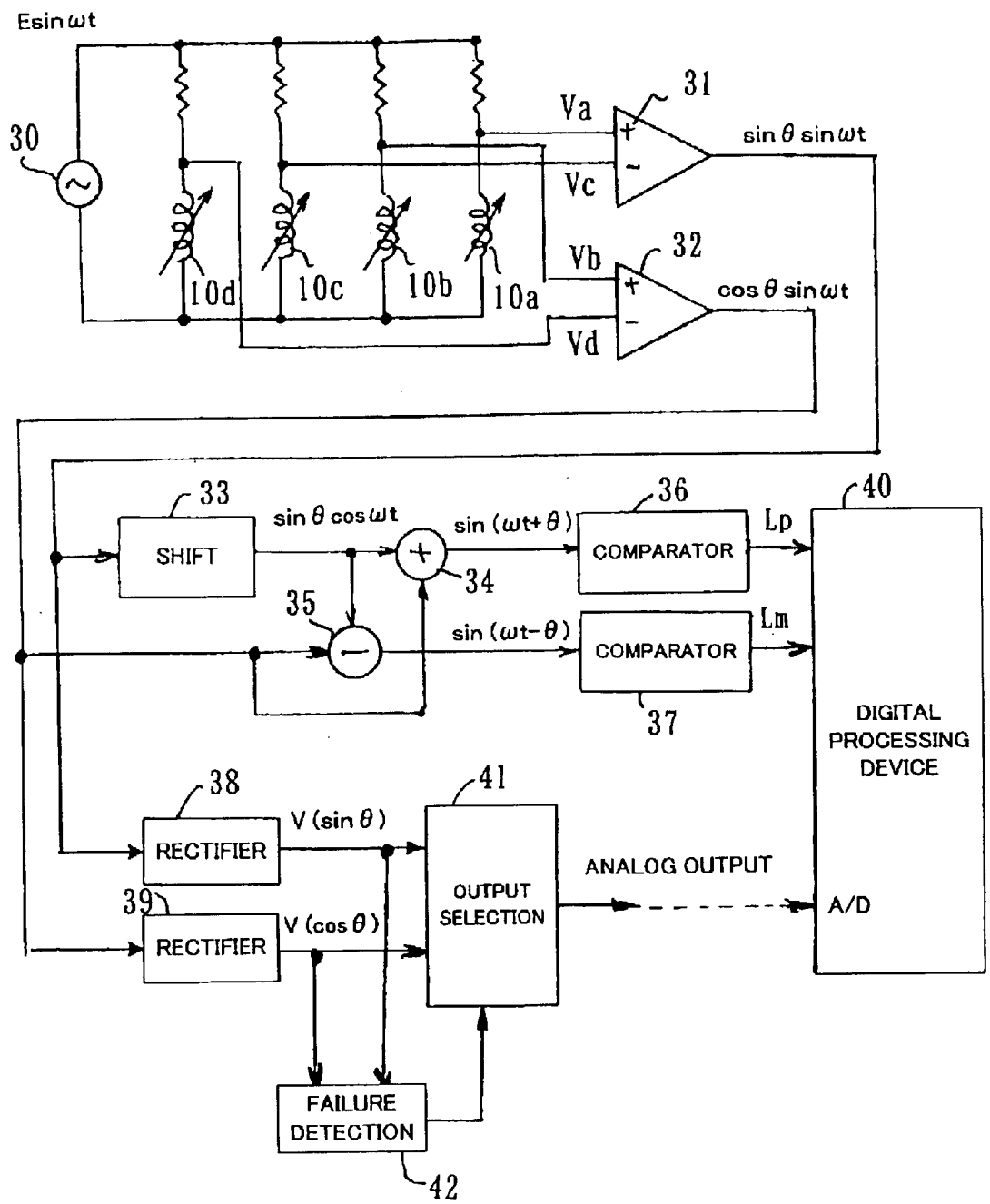
FIG. 4 is a diagram showing an example of electric circuitry applicable to the relative-rotational-position detection apparatus shown in FIG. 1.

(2) Example of Circuitry Construction:

FIG. 4 shows an example of electric circuitry applicable to the relative-rotational-position detection apparatus of FIG. 1. It should be appreciated that this electric circuitry is applicable to any other later-described embodiments of the relative-rotational-position detection apparatus as well as to the embodiment shown in FIG. 1. In FIG. 4, each of the coils 10a to 10d is shown equivalently as a variable inductance element. The coils 10a to 10d are excited by a predetermined high-frequency A.C. signal (for convenience' sake, denoted by Esinωt) in a single phase with a constant voltage or current. As indicated below, voltages Va, Vb, Vc and Vd that are produced in the coils 10a, 10b, 10c and 10d, respectively, present intensity corresponding to the impedance values of tracks A to D that correspond to the above-mentioned angular variable θ responsive to a relative rotational position to be detected.

Figure 5:
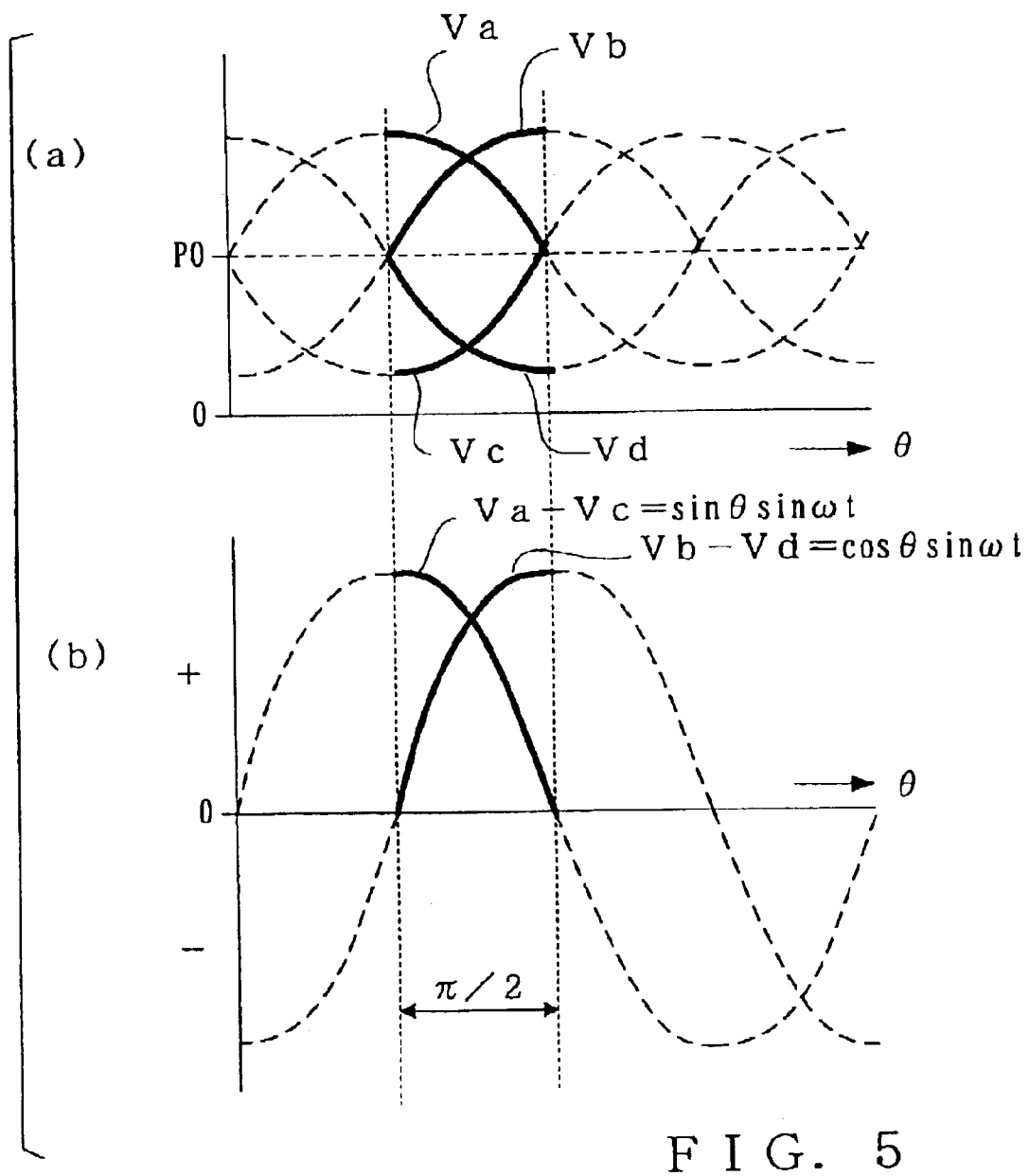
FIG. 5 is a diagram schematically showing voltages produced in individual coils of FIG. 1 only in relation to a θ component and also showing examples of synthesized outputs of two tracks corresponding to a sine phase and two tracks corresponding to a cosine phase.

$Va = (P_0 + \sin\theta)\sin\omega t$ $Vb = (P_0 + \cos\theta)\sin\omega t$ $Vc = (P_0 - \sin\theta)\sin\omega t$ $Vd = (P_0 - \cos\theta)\sin\omega t$ Section (a) of FIG. 5 is a graph schematically showing voltages Va, Vb, Vc and Vd produced in the coils 10a, 10b, 10c and 10d only with regard to the "θ" component (component of time t are not shown).

Arithmetic operator 31 in FIG. 4 calculates a difference between the output voltage Va of the coil 10a corresponding to track A and the output voltage Vc of the coil 10c corresponding to track C varying differentially relative to the output voltage Va and thereby generates an A.C. output signal having an amplitude coefficient of a sine function characteristic of the angular variable θ, as expressed below.

$$Va - Vc = (P_0 + \sin\theta)\sin\omega t - (P_0 - \sin\theta)\sin\omega t$$
$$= 2\sin\theta\sin\omega t$$

Arithmetic operator 32 calculates a difference between the output voltage Vb of the coil 10b corresponding to track B and the output voltage Vd of the coil 10d corresponding to track D varying differentially with respect to the output voltage Vb and thereby generates an A.C. output signal having an amplitude coefficient of a cosine function characteristic of the angular variable θ, as expressed below.

$$Vb - Vd = (P_0 + \cos\theta)\sin\omega t - (P_0 - \cos\theta)\sin\omega t$$
$$= 2\cos\theta\sin\omega t$$

In this way, there can be obtained two A.C. output signals "2 sin θ sin ωt" and "2 cos θ sin ωt" having been modulated with two cyclic amplitude functions (sin θ and cos θ), respectively, that contain the angular variable θ correlating to a relative position to be detected; hereinafter, the coefficient "2 " will be omitted for simplicity. The thus-obtained A.C. output signals are similar to a sine-phase output signal "sin θ sin ωt" and cosine-phase output signal "cos θ sin ωt" produced by a detector commonly known as a resolver. Section (b) of FIG. 5 is a graph schematically showing the sine-phase output signal "sin θ sin ωt" and cosine-phase output signal "cos θ sin ωt" output from the arithmetic operators 31 and 32 only with regard to the θ component (component of time t is not shown). Note that the designations "sine-phase" and "cosine-phase" and the representations of the amplitude functions "sine" and "cosine" of the two A.C. output signals are just for illustrative purposes and the "sine" and "cosine" may be replaced with "cosine" and "sine", respectively; namely, it is only necessary that one of the amplitude functions be "sine" and the other amplitude function be "cosine". In other words, the output signals of the arithmetic operators 31 and 32 may be expressed as "Va−Vc=cos θ sin ωt" and "Vb−Vd=sin θ sin ωt", respectively.

Now explaining compensation of temperature drift characteristics, the impedance of the individual coils 10a to 10d changes in response to an ambient temperature, so that the output voltages Va to Vd of the coils 10a to 10d also change in response to the ambient temperature. However, the A.C. output signals of sine and cosine function characteristics "sin θ sin ωt" and "cos θ sin ωt" obtained by arithmetically synthesizing the output voltages Va to Vd can be prevented from being influenced by coil impedance variations caused by a temperature drift, because temperature drift errors of the coils 10a to 10d are completely compensated for by the arithmetic operations of "Va−Vc" and "Vb−Vd". As a result, the instant embodiment permits high-accuracy detection.

The instant embodiment is capable of detecting a relative rotational position (or torque in the case where the embodiment is applied as a torque sensor) on the basis of the two A.C. output signals "sin θ sin ωt" and "cos θ sin ωt" produced by the arithmetic operators 31 and 32 using either the phase detection scheme or the voltage detection scheme.

As the phase detection scheme, there may be used the technique disclosed, by the assignee of the present application, in Japanese Patent Laid-open Publication No. HEI-9-126809. For example, an A.C. signal sin θ cos ωt is generated by a shift circuit 33 shifting one of the A.C. output signals, sinθsinωt, by an electrical angle of 90°, and additive and subtractive synthesis is performed, via an adder 34 and subtracted 35, between the thus-generated A.C. signal sin θ cos ωt and the other A.C. output signal cos θ sin ωt, so as to generate two A.C. signals phase-shifted from each other in phase-advancing and phase-retarding directions in accordance with the angular variable θ (i.e., signals with the phase component θ converted to an A.C. phase shift amount). Then, zero cross points of the phase-shifted A.C. signals sin(ωt+θ) and sin(ωt−θ) are detected by comparators 36 and 37 to generate a zero-cross detection pulse Lp corresponding to the detected A.C. signals sin(ωt+θ) of the advanced phase and a zero-cross detection pulse Lm corresponding to the detected A.C. signals sin(ωt−θ) of the retarded phase, and the thus-generated zero-cross detection pulses Lp and Lm are then sent to a digital processing device 40. The digital processing device 40 measures a time difference of the generation time point of the zero-cross detection pulse Lp of the advanced-phase A.C. signal from a zero-phase time point of the reference signal sin ωt, to thereby digitally detect a phase shift amount +θ of the advanced-phase A.C. signal. Similarly, the digital processing device 40 measures a time difference of the generation time point of the zero-cross detection pulse Lm of the retarded-phase A.C. signal from the zero-phase time point of the reference signal sin ωt, to thereby digitally detect a phase shift amount −θ of the retarded-phase A.C. signal. Because an error ±δ resulting from a temperature drift and other factors is included in both of the phase shift amount +θ and phase shift amount −θ of the advanced- and retarded-phase A.C. signals in a same direction and same amount, accurate phase detection data θ with such an error ±δ removed therefrom can be obtained by the digital processing device 40 further performing predetermined arithmetic operations that include addition or subtraction between the detected phase values +θ and −θ of the advanced-phase A.C. signal and retarded-phase A.C. signal. For example, the digital processing device 40 may comprise a general-purpose microcomputer.

By the compensating arithmetic operations using the above-mentioned detected phase values +θ and −θ of the advanced-phase and retarded-phase A.C. signals, it is possible to completely remove temperature drift error components that could not be removed through the differential arithmetic operations. Namely, although the differential arithmetic operations by the arithmetic operators 31 and 32 can compensate for temperature drift errors of the coil impedance, they can not compensate for temperature drift error components resulting from eddy current losses of the antimagnetic metals forming the outer and inner cylindrical sections 11 and 12 or core losses of the magnetic metal. However, the compensating arithmetic operations, based on the phase detection scheme and using the above-mentioned detected phase values +θ and −θ of the advanced-phase and retarded-phase A.C. signals, can completely remove the temperature drift error components that could not be removed through the differential arithmetic operations.

Electric circuitry for the voltage detection scheme is constructed by rectifying, via rectifiers 38 and 39, the two A.C. output signals sin θ sin ωt and cos θ sin ωt produced from the arithmetic operators 31 and 32 and thereby obtaining analog voltages V(sin θ) and V(cos θ) corresponding to the respective amplitude coefficient components sine and cos θ. In this case, the relative rotational position detection can be performed by just rectifying only one of the two A.C. output signals sin θ sin ωt and cos θ sin ωt. However, to implement the dual-sensing function, the instant embodiment is arranged to rectify both of the A.C. output signals sin θ sin ωt and cos θ sin ωt so as to generate two analog voltages V(sin θ) and V(cos θ) that present opposite function characteristics in response to the angular variable θ correlating to a relative rotational position to be detected. Namely, the characteristics of the two analog voltages V(sin θ) and V(cos θ) are the same as the variation characteristics of "Va−Vc" and "Vb−Vd" shown in section (b) of FIG. 5. Such two detection voltages of the opposite characteristics can appropriately achieve dual-sensing performance that is often required as redundant safety measures of torque sensors mounted on motor vehicles. Normally, in a case where either one of the analog detection voltages V(sin θ) or V(cos θ) is used and when there has occurred a failure or anomaly in one detection system associated with the one analog voltage V(sin θ) or V(cos θ), the other analog detection voltage V(cos θ) or V(sin θ) from the properly-functioning detection system is used. For example, the instant embodiment may be arranged in such a manner that a failure detection circuit 42 monitors respective states of the two detection voltages V(sin θ) and V(cos θ) of the two detection systems so as to detect presence/absence of any abnormal condition so that an output selection circuit 41 normally selectively outputs a predetermined one of the analog detection voltages V(sin θ) or V(cos θ) but, when there has been detected an abnormal condition, such as a level drop due to a broken wire, of the one analog detection voltage V(sin θ) or V(cos θ), the output selection circuit 41 is controlled to selectively output the other voltage V(cos θ) or V(sin θ) having no anomaly. The analog voltage thus output via the output selection circuit 41 may be used either directly or after being converted into digital form.

As set forth earlier in relation to FIG. 3, the variable range (i.e. detectable range) of each of the amplitude functions sin θ and cos θ of the A.C. output signals sin θ sin ωt and cos θ sin ωt is about one-quarter of a cycle (about π/2 or 90° electrical angle) rather than one full cycle (2π). FIG. 5 shows such detectable ranges in solid lines. By thus limiting the variable range (i.e. detectable range) of each of the amplitude functions sin θ and cos θ of the A.C. output signals sin θ sin ωt and cos θcos ωt to about one-quarter of a cycle (about π/2 or 90° electrical angle), the instant embodiment is capable of generating two effective detection voltages V(sin θ) and V(cos θ). Thus, although the measurable phase range is also about one-quarter of a cycle (about π/2 or 90° electrical angle) in the phase detection scheme, the instant embodiment can perform high-accuracy phase detection with the phase detection scheme, because the relatively rotatable range, i.e. relative-rotation detection range, is considerably limited in this case.

The electric circuitry used here may be simplified by interconnecting the coils 10a and 10c in opposite phases and also interconnecting the coils 10b and 10d in opposite phases so that A.C. output signals corresponding to the respective differences "Va−Vc" and "Vb−Vd" can be obtained without using the particular arithmetic operators 31 and 32.

Figure 6:
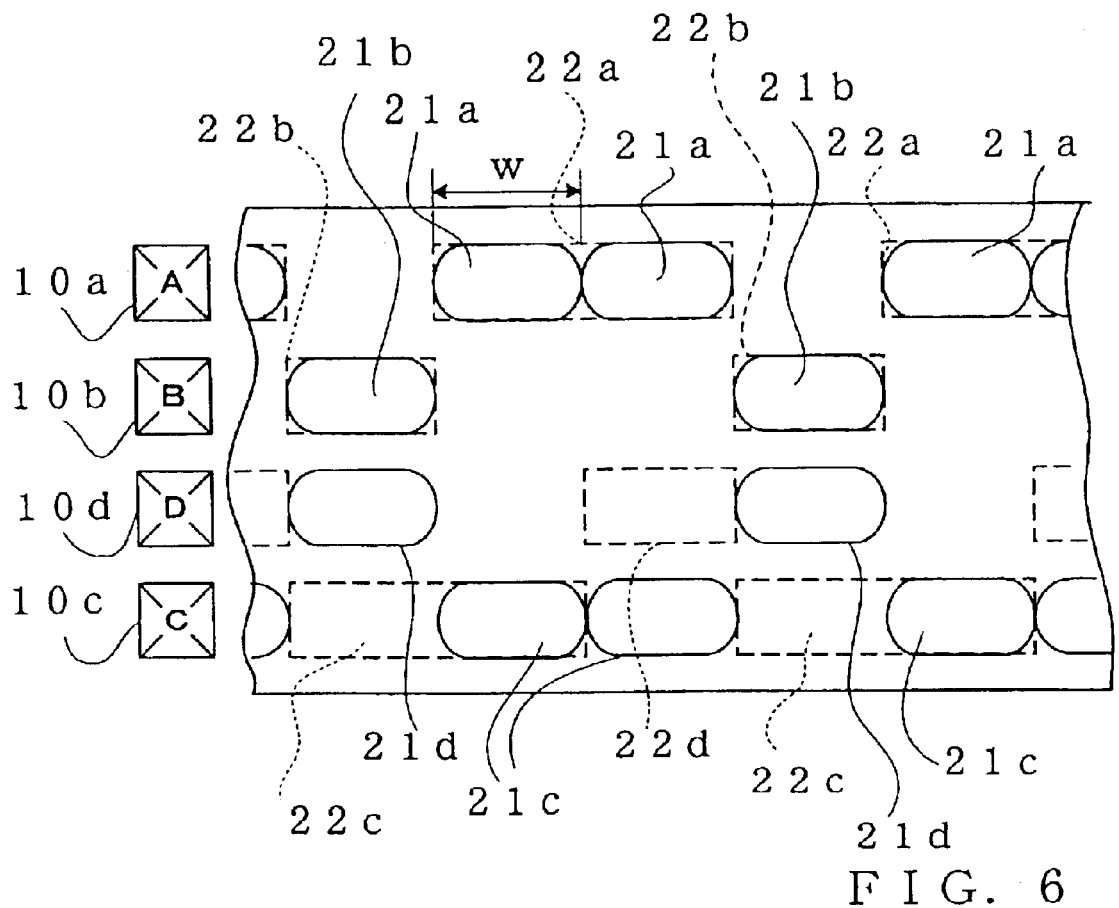
FIG. 6 is a schematic developed view showing another example of the arrangement patterns of open windows in the outer cylindrical section and nonmagnetic windows in the inner cylindrical section shown in FIG. 1.

(3) Modification of Window Patterns:

The shapes and arrangement patterns of the open windows 21a to 21d in the outer cylindrical section 11 and the shapes and arrangement patterns of the nonmagnetic windows 22a to 22d in the inner cylindrical section 12 may be modified variously, namely, a variety of variations of the window shapes and arrangement patterns are possible, as long as the correlations between the open windows 21a to 21d and the nonmagnetic windows 22a to 22d on individual tracks A to D can satisfy the above-mentioned predetermined relational conditions (i.e., sine and cosine function characteristics). FIG. 6 is a developed view showing another example of the window patterns. As illustrated in the figure, tracks A to D need not necessarily be placed in exact alphabetical order; these tracks may be placed in any other suitable order taking, into consideration, balance between the window patterns (e.g., balance in a case where the open window patterns are provided by forming holes). Further, the windows may be formed into any other shape than the rectangular shape, such as a circular, oval or triangular shape.

(4) Example of Method for Forming the Nonmagnetic Windows:

Next, a description is made about examples of a method by which the nonmagnetic windows 22a to 22d in the inner cylindrical section 12 are formed of a material or substance having magnetic shielding or antimagnetic property.

In this example of the nonmagnetic-window forming method, the body of the inner cylindrical section 12 is formed of a ferromagnetic substance, such as iron, into a cylinder having a thin wall thickness. Then, the outer peripheral surface of the body is plated with a predetermined antimagnetic material such as copper. After that, the antimagnetic substance of unnecessary portions of the body is removed by etching such that only the antimagnetic substance applied with the patterns of the nonmagnetic windows 22a to 22d to be ultimately formed can remain on the outer peripheral surface of the body.

According to another example of the nonmagnetic-window forming method, the inner cylindrical section 12 is formed as a dual-cylinder structure having inner and outer cylindrical portions. The inner cylinder of the inner cylindrical section 12 is formed of a ferromagnetic substance, such as iron, while the outer cylinder of the inner cylindrical section 12 is formed of antimagnetic metal, such as copper or brass, into a small wall thickness. Open windows are formed in the thin outer cylinder of antimagnetic metal so that the patterns of the nonmagnetic windows 22a to 22d to be formed ultimately can remain on the outer cylinder of the inner cylindrical section 12 and the ferromagnetic inner cylinder is exposed through the open windows. In this case, both of the inner and outer cylinders of the inner cylindrical section 12 may be arranged to rotate together as a unit, or only the thin outer cylinder of antimagnetic (or diamagnetic) metal may be arranged to rotate with the ferromagnetic inner cylinder arranged to be non-rotatable.

According to still another example of the nonmagnetic-window forming method, the body of the inner cylindrical section 12 is formed as a cylinder of a nonmagnetic substance such as a plastic, or as a cylinder of antimagnetic metal, such as copper or brass, which has a small wall thickness. Ferromagnetic substance, such as iron, is formed in predetermined patterns on the outer peripheral surface of such a cylinder so that the patterns of the nonmagnetic windows 22a to 22d to be formed can remain on the cylinder as nonmagnetic or antimagnetic (or diamagnetic) patterns. In this case, as one way of forming the predetermined patterns of the ferromagnetic substance, the entire outer peripheral surface of the cylinder is first plated with a ferromagnetic substance such as iron and then etched to remove the ferromagnetic substance so that the patterns of the nonmagnetic windows 22a to 22d to be formed can remain on the cylinder's outer peripheral surface. As another way of forming the predetermined patterns of the ferromagnetic substance, powders of a ferromagnetic substance, such as ferrite, are welded or sintered in predetermined patterns on the outer peripheral surface of the cylinder so that the patterns of the nonmagnetic windows 22a to 22d to be formed can remain on the cylinder's outer peripheral surface.

According to still another example of the nonmagnetic-window forming method, the body of the inner cylindrical section 12 is formed as a cylinder of a ferromagnetic substance such as iron, laser baking is performed in predetermined patterns on the outer peripheral surface of the cylinder so that the laser-baked portions are demagnetized and thus the patterns of the nonmagnetic windows 22a to 22d to be formed can remain on the cylinder's outer peripheral surface.

(5) Modified Construction:

In the case where the relative-rotational-position detection apparatus in accordance with the instant embodiment is employed as a torque sensor in a power steering mechanism of a motor vehicle, the first and second shafts 1 and 2 are interconnected via a torsion bar, as noted earlier. In some case, the torsion bar is made of magnetic metal such as iron. Namely, in such a case, the magnetic torsion bar is inserted inside the inner cylindrical section 12 of the relative-rotational-position detection apparatus, and thus the effectiveness of the nonmagnetic windows 22a to 22d (i.e., detecting sensitivity) might be degraded due to a bias applied to the nonmagnetic windows 22a to 22d . To deal with such possible degradation of the detecting sensitivity, a cylinder 14 made of antimagnetic metal, such as copper or iron, and having a small wall thickness may be inserted inside the inner cylindrical section 12 but outside the torsion bar 3 made of magnetic metal. With such arrangements, the torsion bar 3 made of magnetic metal centrally located in the inner cylindrical section 12 can be magnetically shielded in such a manner that the detecting sensitivity is not adversely influenced.

Figure 8A:
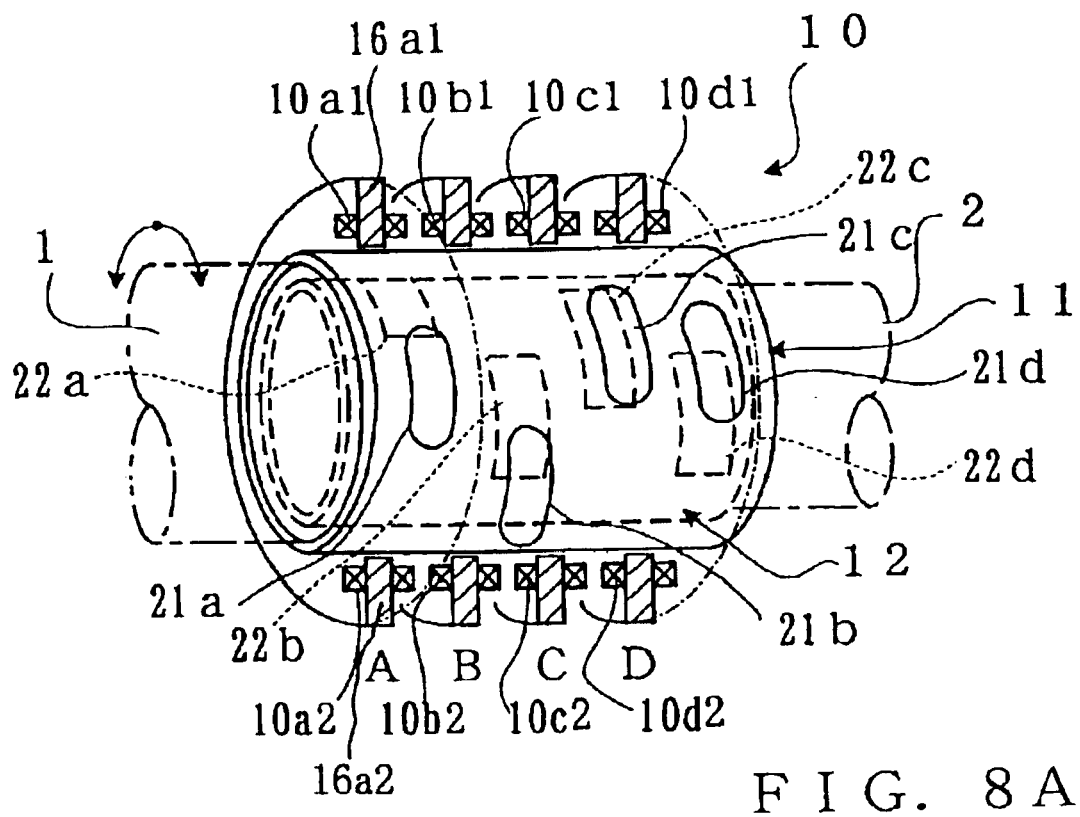
FIG. 8A is a partly-sectional perspective view showing a relative-rotational-position detection apparatus in accordance with a second embodiment of the present invention.
Figure 8B:
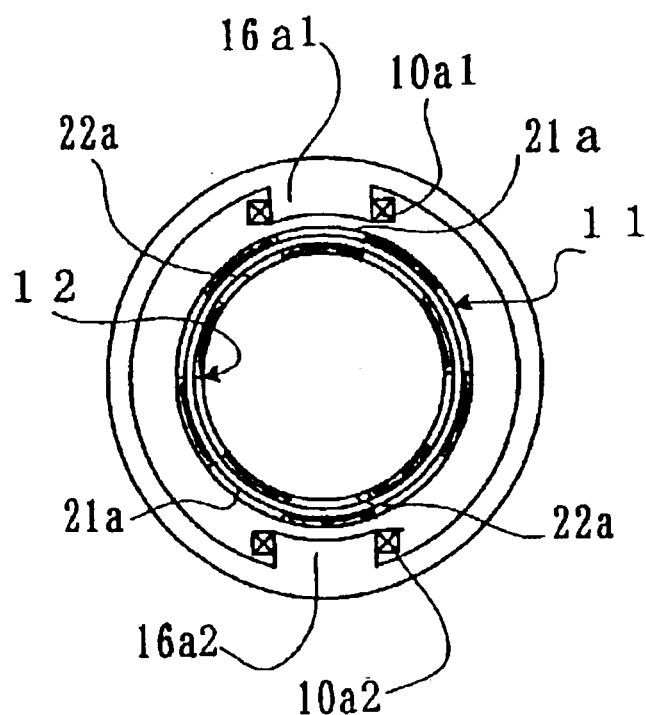
FIG. 8B is a cross-sectional view of the relative-rotational-position detection apparatus of FIG. 8A taken diametrically across the apparatus.

(6) Second Embodiment:

FIG. 8 shows a relative-rotational-position detection apparatus in accordance with a second embodiment of the present invention, which is generally similar to the first embodiment of FIG. 1 except that the coil section 10 is constructed differently from that of FIG. 1. Specifically, FIG. 8A is a schematic perspective view of the second embodiment, and FIG. 8B is a cross-sectional view taken diametrically across a portion of the coil section 10 corresponding to one of the tracks (e.g., track A). On the one track (e.g., track A), a plurality of (in the illustrated example, two) iron cores 16a1 and 16a2 are provided and circumferentially spaced from each other by a predetermined angular interval (e.g., 180° interval as illustrated in FIG. 8B). Coils 10a1 and 10a2 are mounted on the iron cores 16a1 and 16a2, respectively. Magnetic flux is produced, by the coils 10a1 and 10a2, in a radial direction from ends of the iron cores 16a1 and 16a2 toward the outer and inner cylindrical sections 11 and 12. Circumferential length of each of the open windows 21 a in the outer cylindrical section 11 generally corresponds to a length w of each of the iron cores 16a1 and 16a2. Further, as illustrated, an arrangement pattern of the open windows 21 a is determined such that when the opposite ends of one of the iron cores 16a1 completely overlap the open window 21a, the opposite ends of the other iron core 16a2 do not overlap the open window 21a at all. Namely, irrespective of a rotational position of the outer cylindrical section 11, a total amount of overlapping of the iron cores 16a1 and 16a2 with the open window 21a remains constant. Therefore, a signal obtained by adding respective outputs of the two coils 10a1 and 10a2 presents the same characteristic as the output of one coil 10a in the embodiment of FIG. 1. Thus, the signal obtained by adding the respective outputs of the two coils 10a1 and 10a2 of the two coils 10a1 and 10a2 on track A in the illustrated example of FIG. 8 represents degree of the overlap between the open window 21a and the nonmagnetic window 22a corresponding to a relative rotational position of the outer and inner cylindrical sections 11 and 12, in a similar manner to the output signal Va of the coil 10a in the embodiment of FIG. 1.

For each of other tracks B to D too, two coils 10b1 and 10b2, 10c1 and 10c2 or 10d1 and 10d2 wound on the respective iron cores constitute a coil section, so that a signal obtained by adding the respective outputs of the two coils becomes a detection output signal Vb, Vc or Vd of the corresponding track B, C or D. The detection output signals Va to Vd on tracks A to D will be processed in generally the same manner as in the above-described embodiment of FIG. 1.

Whereas the coils of tracks A to D are shown in FIG. 8A as positioned at same mechanical angles (aligned in the axial direction), these coils of tracks A to D may be positioned in other desired relations to one another.

Figure 9:
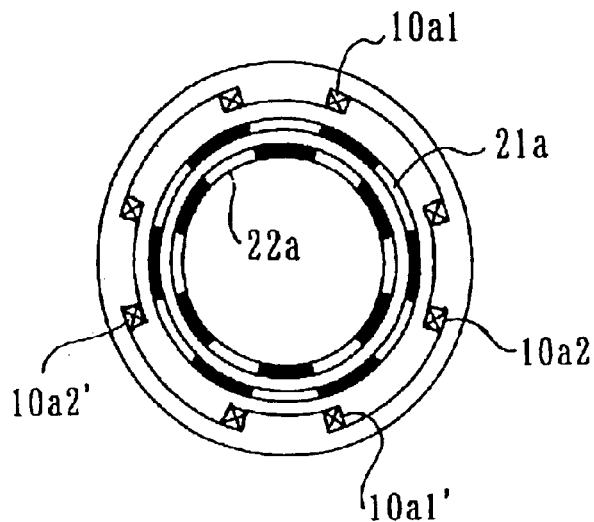
FIG. 9 is a cross-sectional view showing a modification of the relative-rotational-position detection apparatus shown in FIG. 8B, which is taken diametrically across a portion of the coil section corresponding to one of the tracks.

Further, the number of the iron cores, i.e. the coils, on each of tracks A to D is not necessarily limited to two; it may be a greater even number than two. In such a case, the coils of a same phase may be positioned at equal angular or circumferential intervals. In this way, even where there is any deviation, from the center of rotation, of the iron cores, errors due to the deviation can be canceled out by addition of detection output signals of the same phase. FIG. 9 is a cross-sectional view taken diametrically across a portion of the coil section 10 corresponding to track A, which shows an example of such a modified construction. In the illustrated example, the relationship between the coil 10a1 and open windows 21a of the outer cylindrical section 11 and the relationship between the coil 10a1' and open window 21a of the outer cylindrical section 11 are of a same phase, and the coil 10*a*1' is displaced 180° from (i.e., is positioned in diametric symmetry with) the coil 10*a*1. The relationship between the coil 10*a*2 and open window 21*a* of the outer cylindrical section 11 and the relationship between the coil 10*a*2' and open windows 21*a* of the outer cylindrical section 11 are of a same phase, and the coil 10*a*2' is displaced 180° from (i.e., is positioned in diametric symmetry with) the coil 10*a*2. Although FIG. 9 shows only two coils having the same phase with respect to the open windows 21*a* of the outer cylindrical section 11, there may be provided three or more coils having the same phase with respect to the open windows 21*a*. In the case where there are provided three coils having the same phase, the coils are positioned at 120° intervals, and an appropriate length w and number of the open windows 21*a* are chosen accordingly.

Figure 7:
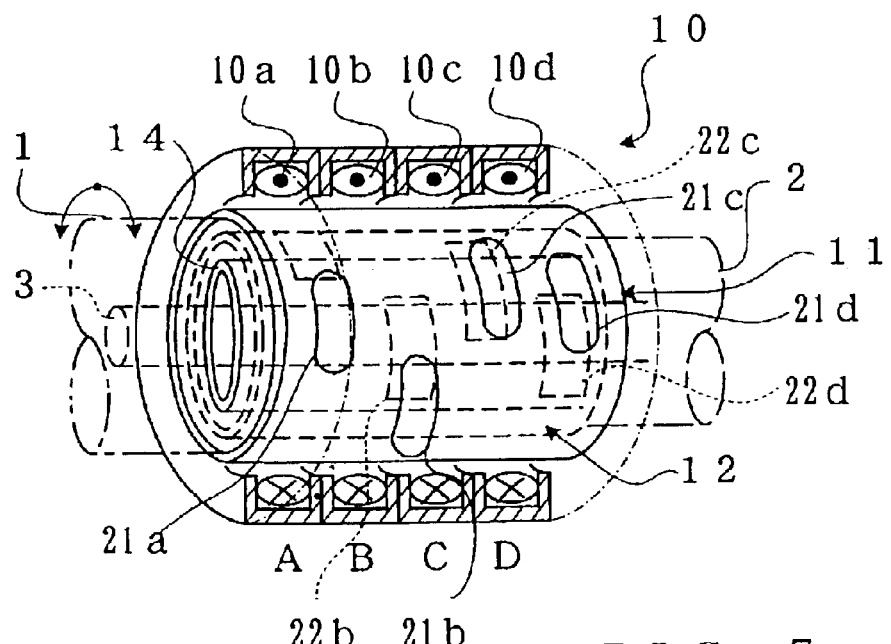
FIG. 7 is a partly-sectional perspective view showing a modification of the first embodiment shown in FIG. 1.

With the arrangements of the coils as shown in FIGS. 8 and 9, the magnetic flux of the coils is allowed to easily pass the surface of the inner cylindrical section 12; thus, even where the torsion bar made of a magnetic material is provided near the center of the coil section 10, the magnetic flux can advantageously resist the influence of the torsion bar. Therefore, the necessity of inserting the cylinder 14 made of antimagnetic metal as shown in FIG. 7 can be decreased.

Figure 10A:
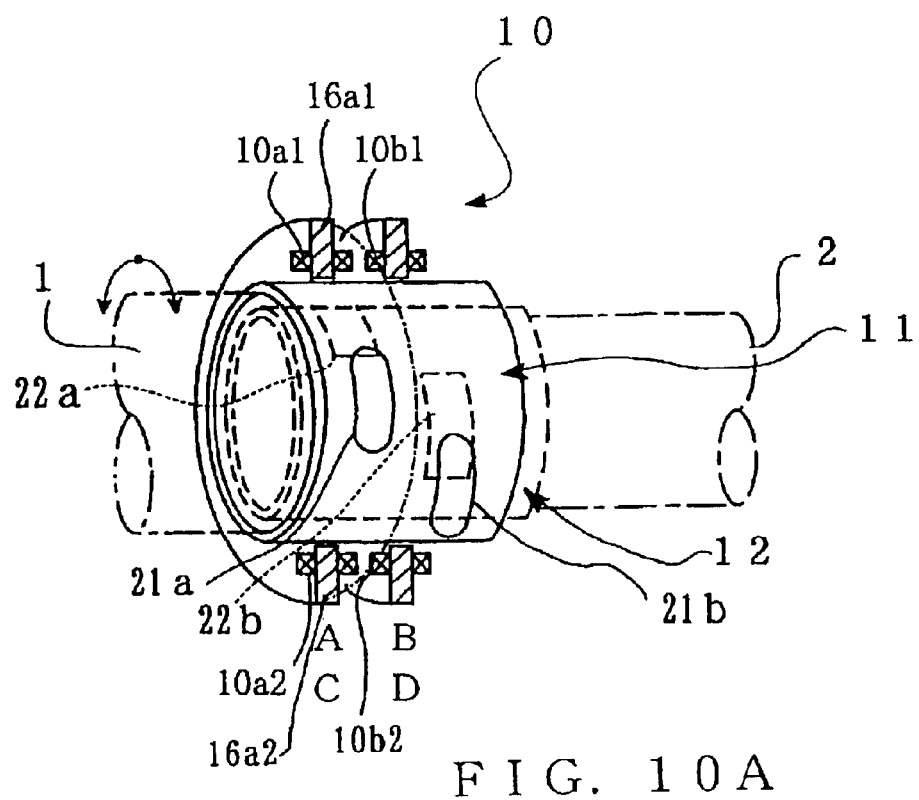
FIG. 10A is a partly-sectional perspective view showing another modification of the relative-rotational-position detection apparatus of FIG. 8A, which is characterized by a two-track construction.
Figure 10B:
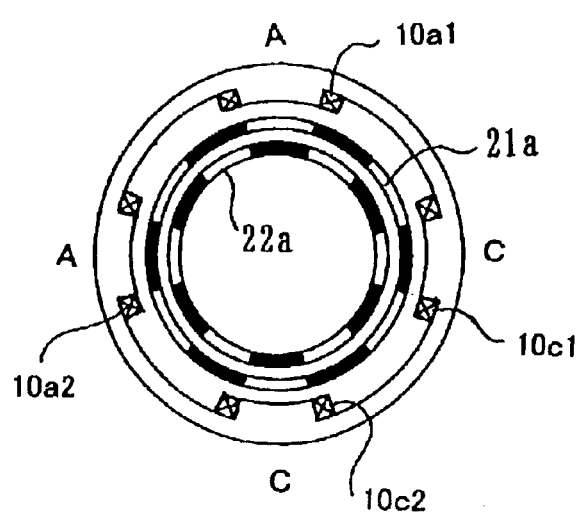
FIGS. 10B and 10C are both cross-sectional views taken diametrically across the detection apparatus of FIG. 10A.
Figure 10C:
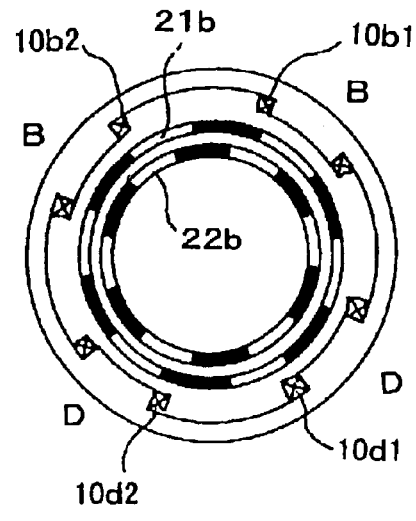

(7) Modification of the Second Embodiment:

The second embodiment of FIG. 8 may be modified in such a manner that same window rows of the outer and inner cylindrical sections 11 and 12 may be shared between sine-phase track A and minus-sine-phase track B, and same window rows of the outer and inner cylindrical section 11 and 12 may be shared between cosine-phase track B and minus-cosine-phase track D, as illustratively shown in FIG. 10. As illustrated in FIG. 10A, the outer cylindrical section 11 apparently has two rows of the open windows: a row of the open windows 21*a* corresponding to track A and a row of the open windows 21*b* corresponding to track B. Similarly, the inner cylindrical section 12 apparently has two rows of the nonmagnetic windows: a row of the nonmagnetic windows 22*a* corresponding to track A and a row of the nonmagnetic windows 22*b* corresponding to track B. FIG. 10B is a cross-sectional view taken diametrically across a portion of the coil section 10 corresponding to track A, and FIG. 10C is a cross-sectional view taken diametrically across a portion of the coil section 10 corresponding to track B.

As illustrated in FIG. 10B, the coils 10*c*1 and 10*c*2 corresponding to track C are positioned on the same circumference as the coils 10*a*1 and 10*a*2 corresponding to track A. In this instance, the relationship of the open windows 21*a* of the outer cylindrical section 11 to the coil 10*a*1 and the relationship of the open windows 21*a* of the outer cylindrical section 11 to the coil 10*c*1 are of opposite phases, so that the sine and minus cosine relationship is satisfied in this instance. As noted earlier, the relationship of the open windows 21*a* of the outer cylindrical section 11 to the coil 10*a*1 and the relationship of the open windows 21*a* of the outer cylindrical section 11 to the coil 10*a*2 are of opposite phases, and similarly the relationship of the open windows 21*a* of the outer cylindrical section 11 to the coil 10*c*1 and the relationship of the open windows 21*a* of the outer cylindrical section 11 to the coil 10*c*2 are of opposite phases. Of course, in this case, respective outputs of the coils 10*a*1 and 10*a*2 are summed to provide an output signal Va corresponding to track A, and respective outputs of the coils 10*c*1 and 10*c*2 are summed to provide an output signal Vc corresponding to track C.

Similarly, as illustrated in FIG. 10C, the coils 10*d*1 and 10*d*2 corresponding to track B are positioned on the same circumference as the coils 10*b*1 and 10*b*2 corresponding to track B. In this instance, the relationship of the open windows 21*b* of the outer cylindrical section 11 to the coil 10*b*1 and the relationship of the open windows 21*b* of the outer cylindrical section 11 to the coil 10*d*1 are of opposite phases, so that the sine and minus cosine relationship is satisfied in this instance. As noted earlier, the relationship of the open windows 21*b* of the outer cylindrical section 11 to the coil 10*b*1 and the relationship of the open windows 21*b* of the outer cylindrical section 11 to the coil 10*b*2 are of opposite phases, and the relationship of the open windows 21*b* of the outer cylindrical section 11 to the coil 10*d*1 and the relationship of the open windows 21*b* of the outer cylindrical section 11 to the coil 10*d*2 are of opposite phases. Of course, respective outputs of the coils 10*b*1 and 10*b*2 are summed to provide an output signal Vb corresponding to track B, and respective outputs of the coils 10*d*1 and 10*d*2 are summed to provide an output signal Vd corresponding to track D.

Figure 11:
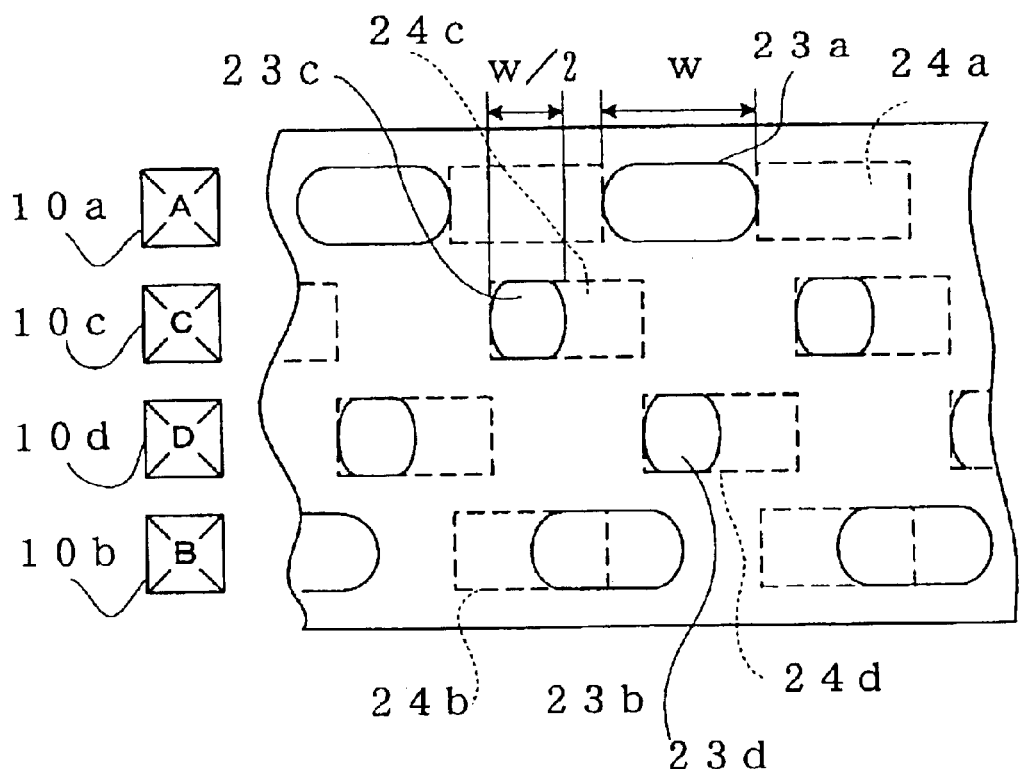
FIG. 11 is a schematic developed view showing a relative-rotational-position detection apparatus in accordance with a third embodiment of the present invention, which particularly shows arrangement patterns of the open windows in the outer cylindrical section and nonmagnetic windows in the inner cylindrical section.

(8) Third Embodiment:

Relative-rotational-position detection apparatus in accordance with a third embodiment of the present invention is of a type which only employs the dual analog voltage detection scheme without employing the phase detection scheme. External appearance of the third embodiment of the relative-rotational-position detection apparatus may be almost similar to that shown in FIG. 1 or 8, and thus illustration of the external appearance is omitted here. FIG. 11 is a developed view showing an example of window patterns of tracks A to D formed by open windows 23*a* to 23*d* and an example of window patterns of tracks A to D formed by nonmagnetic windows 24*a* to 24*d*. Each of the open windows 23*a* and 23*b* of tracks A and B has a length w, each of the open windows 23*c* and 23*d* of tracks C and D has about half the length w (i.e., w/2), and each of the nonmagnetic windows 24*a* to 24*d* of the inner cylindrical section 12 has the same length w as each of the open windows 23*a* and 23*b*. In this embodiment too, the relatively rotatable range, i.e. rotational-position detection range, is half the length w (w/2) of each of the open windows 23*a*. Because the length of each of the open windows 23*c* and 23*d* of tracks C and D is about "w/2" while the length of each of the corresponding nonmagnetic windows 24*a* to 24*d* of the inner cylindrical section 12 is "w", the impedance of the coils 10*c* and 10*d* of tracks C and D does not vary over the entire detection range of "w/2".

In FIG. 11, there is illustratively shown, on the track-by-track basis, relationships between the open windows 23*a*–23*d* of the outer cylindrical section 11 and the nonmagnetic windows 24*a*–24*d* of the inner cylindrical section 12 when the relative rotational position of the first and second shafts 1 and 2 is the leftmost. Here, for track A, there is no overlap at all between the open windows 23*a*, each having the length w, of the outer cylindrical section 11 and the nonmagnetic windows 24*a*, each having the same length w, of the inner cylindrical section 12, so that the coil 10*a* presents the greatest impedance. As the relative rotational position moves toward the rightmost position from the leftmost position, the open windows 23*a* of the outer cylindrical section 11 and the nonmagnetic windows 24*a* of the inner cylindrical section 12 overlap each other and the overlapping area increases gradually. In the rightmost position, one-half of the length of each of the open windows 23*a* overlaps one-half of the length of the nonmagnetic windows 24*a*. In this way, the impedance of the coil 10*a* varies from the maximum value to the mid value as the relative rotational position moves from the leftmost position to the rightmost position.

For track C, when the relative rotational position is the leftmost, the open windows 23c, each having the length w/2, of the outer cylindrical section 11 overlap one-half of the length w of the nonmagnetic windows 24a of the inner cylindrical section 12. Because all of the open windows 23c thus overlap the nonmagnetic windows 24a, the coil 10a presents the smallest impedance. Even while the relative rotational position moves from the leftmost position to the rightmost position, each of the open windows 23c, having the length w/2, of the outer cylindrical section 11 only moves within the corresponding nonmagnetic window 24a, so that the impedance of the coil 10c is kept at its minimum value.

For track B, when the relative rotational position is the leftmost, the open windows 23b, each having the length w, of the outer cylindrical section 11 overlap one-half of the length w of the nonmagnetic windows 24b of the inner cylindrical section 12n and the coil 10b presents the mid value. As the relative rotational position moves toward the rightmost position from the leftmost position, the area of the overlap between the open windows 23b of the outer cylindrical section 11 and the nonmagnetic windows 24b of the inner cylindrical section 12 decreases gradually, as a result of which the open windows 23b do not even slightly overlap the nonmagnetic windows 24b when the relative rotational position is in the rightmost position. In this way, the impedance of the coil 10b varies from the mid value to the maximum value as the relative rotational position moves from the leftmost position to the rightmost position.

For track D, when the relative rotational position is the leftmost, the open windows 23d, each having the length w/2, of the outer cylindrical section 11 overlap one-half of the length w of the nonmagnetic windows 24d of the inner cylindrical section 12. Because all of the open windows 23d thus overlap the nonmagnetic windows 24d, the coil 10a presents the smallest impedance. Even while the relative rotational position moves from the leftmost position to the rightmost position, each of the open windows 23d, having the length w/2, of the outer cylindrical section 11 only moves within the corresponding nonmagnetic windows 24d of the inner cylindrical section 12, so that the impedance of the coil 10c is kept at its minimum value.

Figure 12A:
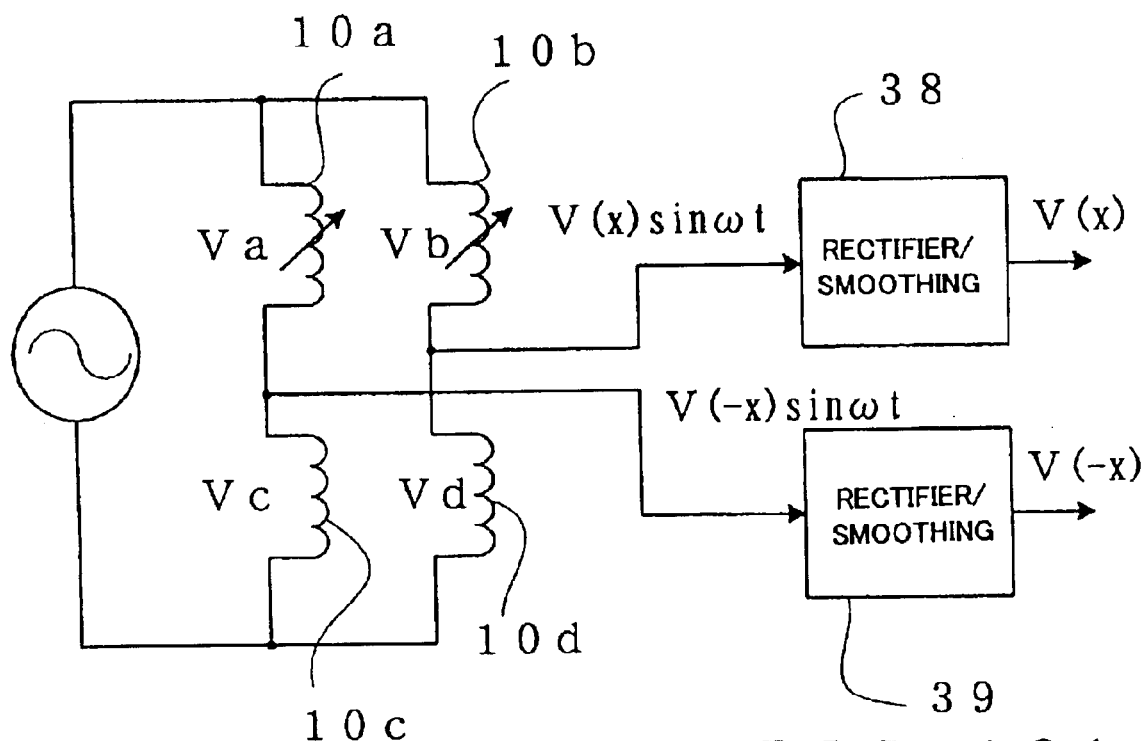
FIG. 12A is a diagram showing an example of electric circuitry applicable to the embodiment shown in FIG. 11.

FIG. 12A is a block diagram showing exemplary electric circuitry of the third embodiment shown in FIG. 11. Here, the coil 10a of track A and coil 10c of track C are connected in series with each other, and an output signal V(x)sin ωt of a first channel is output from the connecting point between the coils 10a and 10c. Further, the coil 10b of track B and coil 10d of track D are connected in series with each other, and an output signal V(-x)sin ωt of a second channel is output from the connecting point between the coils 10d and 10d. As set forth below, the first output signal V(x)sin ωt has an amplitude level corresponding to a ratio between a voltage Va corresponding to the impedance of the coil 10a of track A and a voltage Vc corresponding to the impedance of the coil 10c of track C. Similarly, the second output signal V(-x)sin ωt has an amplitude level corresponding to a ratio between a voltage Vb corresponding to the impedance of the coil 10b of track B and a voltage Vd corresponding to the impedance of the coil 10d of track D. As may be apparent from the foregoing, the voltages Va and Vb take variable values corresponding to a variation in the relative rotational position to be detected, while the voltages Vc and Vd take constant values.

$$V(x)\sin \omega t = [Va/(Va+Vc)]\sin \omega t$$

$$V(-x)\sin \omega t = [Vb/(Vb+Vd)]\sin \omega t$$

Because the amplitude level of the output signal V(x)sin ωt can be expressed by the ratio between the impedance of the two coils 10a and 10c, there can be obtained the output signal having removed therefrom temperature drift errors of the coil impedance; similarly, the second output signal V(-x)sin ωt can have temperature drift errors of the coil impedance removed therefrom.

Figure 12B:
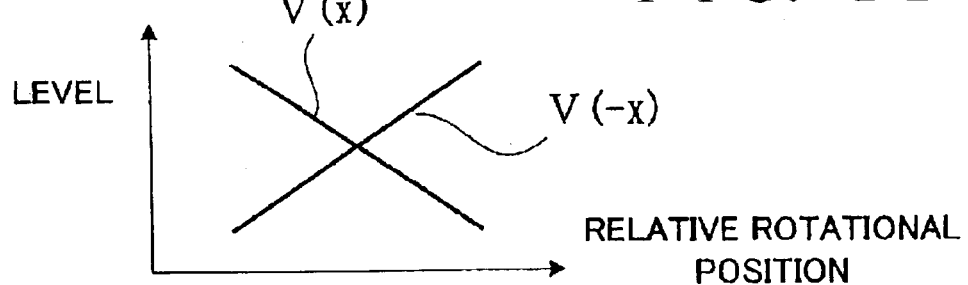
FIG. 12B is a graph explanatory of operation of the embodiment shown in FIG. 12A.

The first and second output signals V(x)sin Ωt and V(-x)sin ωt are rectified by corresponding rectifiers 38 and 39, so as to provide analog output voltages V(x) and V(-x) representative of a relative rotational position to be detected. Examples of such analog output voltages V(x) and V(-x) are shown in FIG. 12B. As shown, the analog output voltage V(-x) of the second channel which corresponds to the ratio between tracks B and D, presents variation characteristics opposite to those of the analog output voltage V(x) of the first channel which corresponds to the ratio between tracks A and C. In this manner, there can be provided dual (two-channel) output signals corresponding to a relative rotational position to be detected, which may appropriately satisfy predetermined safety criteria in the case where the inventive relative-rotational-position detection apparatus is used as a steering shaft torque sensor of a motor vehicle. These analog output voltages V(x) and V(-x) may be used after being further converted into digital signals, in a similar manner to the above-mentioned. Of course, in the third embodiment too, the arrangement patterns of the open windows of the outer cylindrical section 11 and nonmagnetic windows of the inner cylindrical section 12 may be modified variously, without being limited to the illustrated example of FIG. 11, as long as such modifications can ultimately provide two-channel output voltages V(x) and V(-x) of opposite characteristics as having been noted above.

(9) Modification of the Third Embodiment:

FIG. 13 shows a modification of the above-described third embodiment characterized in that the windows of the outer cylindrical section 11 and inner cylindrical section 12 are arranged to constitute only two tracks. Specifically, FIG. 13A is a schematic perspective view of the relative-rotational-position detection apparatus with the coil section shown in section, FIG. 13B is a developed view of the outer and inner cylindrical sections 11 and 12, and FIG. 13C is a diagram showing electric circuitry of the detection apparatus. As shown in FIG. 13, the outer cylindrical section 11 apparently includes two rows of windows: a row of open windows 25a corresponding to track A; and a row of open windows 25c corresponding to track C. Similarly, the inner cylindrical section 12 apparently includes two rows of windows: a row of nonmagnetic windows 26a corresponding to track A; and a row of nonmagnetic windows 26c corresponding to track C. The coil 10d corresponding to track D is provided concentrically with the coil 10a corresponding to track A, and the coil 10b corresponding to track B is provided concentrically with the coil 10c corresponding to track C.

Let it be assumed here that the developed view of FIG. 13B shows a state when the relative rotational position is the leftmost. Here, for track A, there is no overlap at all between the open windows 25a, each having the length w, of the outer cylindrical section 11 and the nonmagnetic windows 26a, each having the same length w, of the inner cylindrical section 12, so that the coil 10a presents the greatest impedance. As the relative rotational position moves toward the rightmost position from the leftmost position, the open windows 25a of the outer cylindrical section 11 and the nonmagnetic windows 26a of the inner cylindrical section 12 overlap each other and the overlapping area increases gradually. In the rightmost position, one-half of the length of each of the open windows 25a overlaps one-half of the length of the nonmagnetic windows 26a. In this way, the impedance of the coil 10a varies from the maximum value to the mid value as the relative rotational position moves from the leftmost position to the rightmost position.

For track C, when the relative rotational position is the leftmost, one-half of the length w of the open windows 25c of the outer cylindrical section 11 overlaps one-half of the length w of the nonmagnetic windows 26c of the inner cylindrical section 12, so that the coil 10c presents the mid impedance value. As the relative rotational position moves toward the rightmost position from the leftmost position, the area of the overlap between the open windows 25c of the outer cylindrical section 11 and the nonmagnetic windows 26c of the inner cylindrical section 12 increases gradually. In the rightmost position, all of the open windows 25c fully overlap the corresponding nonmagnetic windows 26c. In this way, the impedance of the coil 10a varies from the mid value to the minimum value as the relative rotational position moves from the leftmost position to the rightmost position.

The impedance of the coil 10d of track D disposed in the same position as or concentrically with the coil 10a varies from the maximum value to the mid value as the relative rotational position moves from the leftmost position to the rightmost position. The impedance of the coil 10b of track B disposed in the same position as or concentrically with the coil 10c varies from the mid value to the minimum value as the relative rotational position moves from the leftmost position to the rightmost position.

As shown in FIG. 13C, the coils 10a and 10c are connected with each other in a differential fashion, the output signal from which is rectified via the rectifier 38. Similarly, the coils 10b and 10d are connected with each other in a differential fashion, the output signal from which is rectified via the other rectifier 39. In this way, the differential output signal V(-y) from the coils 10b and 10d presents opposite characteristics to those of the differential output signal V(y) from the coils 10a and 10c as seen in FIG. 13D; namely, there can be provided two-channel output signals. Further, the differential connection between the coils can remove temperature drift errors of the coil impedance.

(10) Fourth Embodiment:

In the embodiment of FIG. 1 or the like where the ring-shaped coils 10a, 10b, 10c and 10d are positioned adjacent to each other, undesired crosstalk or interference is likely to occur between the coils. The magnetic shielding cases 13a to 13d, formed of a magnetic or antimagnetic substance, function as means for eliminating the undesired crosstalk or interference. Another possible approach for eliminating the crosstalk or interference, although similar to the provision of the cases 13a to 13d, is to position those tracks adjacent to each other for which the interference does not become any significant problem. Namely, in the case of FIG. 1, tracks A and C are positioned adjacent to each other since these tracks A and C are not adversely influenced by the interference, and the coils 10a and 10c corresponding to tracks A and C are accommodated in a same magnetic shielding case formed of a magnetic or antimagnetic substance. Similarly, tracks B and D are positioned adjacent to each other since these tracks B and D are not adversely influenced by the interference, and the coils 10b and 10d corresponding to tracks B and D are accommodated in a same magnetic shielding case formed of a magnetic or antimagnetic substance. Approach proposed here as a fourth embodiment of the present invention is intended to eliminate the crosstalk or interference problem by time-divisional excitation of the coils.

FIG. 14 is a circuit diagram explanatory of an example of such time-divisional excitation. Exciting A.C. signal sin 6 t is applied via a driver 41 to a pair of the sine- and minus-sine-phase coils 10a and 10c corresponding to track A and track C, while the exciting A.C. signal sin ωt is applied via a driver 42 to a pair of the cosine- and minus-cosine-phase coils 10b and 10d corresponding to track B and track D. Time-divisional control pulse signal TDM having a 50% duty factor takes a value "1" in synchronism with a predetermined cycle of the exciting A.C. signal sin ωt and takes a value "0" in synchronism with the next cycle of the exciting A.C. signal sin ωt. While the time-divisional control pulse signal TDM is at the value "1", an analog switch 43a is turned on to activate the driver 41 so that an exciting current corresponding to the exciting A.C. signal sin ωt is applied to the pair of the sine- and minus-sine-phase coils 10a and 10c corresponding to track A and track C. At that time, no exciting current is applied to the coils 10b and 10d corresponding to track B and track D, and so no crosstalk or interference occurs. Differential amplifier 45 obtains a difference between outputs of the coils 10a and 10c and then outputs a signal that corresponds to the above-mentioned output signal sin θ sin ωt. Analog switch 44a connected to the output of the differential amplifier 45 is turned on in synchronism with an analog switch 43a while the time-divisional control pulse signal TDM is at the value "1", so as to output the signal sin θ sin ωt from the differential amplifier 45.

On the other hand, while the time-divisional control pulse signal TDM is at the value "0", an analog switch 43b is turned on to activate the driver 42 so that an exciting current corresponding to the exciting A.C. signal sin ωt is applied to the pair of the cosine- and minus-cosine-phase coils 10b and 10d corresponding to track B and track D. At that time, no exciting current is applied to the coils 10a and 10c corresponding to track A and track C, and so no crosstalk or interference occurs. Differential amplifier 46 obtains a difference between outputs of the coils 10b and 10d and then outputs a signal that corresponds to the above-mentioned output signal cos θ sin ωt. Analog switch 44b connected to the output of the differential amplifier 46 is turned on in synchronism with the analog switch 43b while the time-divisional control pulse signal TDM is at the value "0", so as to output the signal cos θ sin ωt from the differential amplifier 46.

The output signals sin θ sin ωt and cos θ sin ωt from the analog switches 44a and 44b are rectified by respective rectifiers (not shown), and thus can be used as two-channel analog output voltages corresponding to a relative rotational position to be detected. Here, in individual time slots when the corresponding analog switches are OFF, it just suffices to hold the output voltage as necessary.

The output signals sin θ sin ωt and cos θ sin ωt from the analog switches 44a and 44b may also be used in the phase detection scheme. For that purpose, in time slots when the corresponding analog switches are OFF, respective waveforms of the output signals sin θ sin ωt and cos θcos ωt may be held in an analog buffer, so that timewise-continuous output signals sin θ sin ωt and cos θcos ωt can be generated by reading out the waveforms previously held in the time slots when the corresponding analog switches were OFF.

Figure 15A:
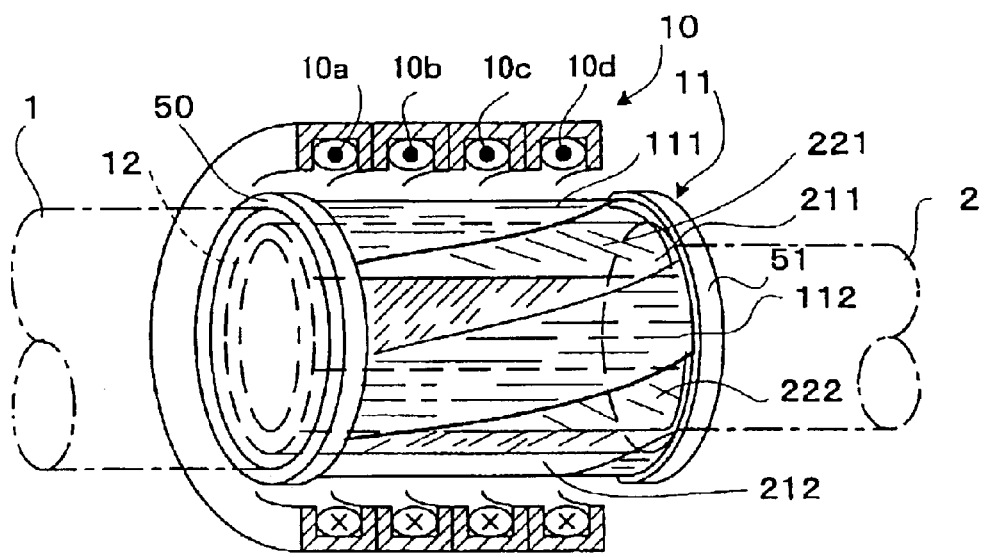
FIG. 15A is a partly-sectional perspective view showing still another modification of the relative-rotational-position detection apparatus of the invention.
Figure 15B:
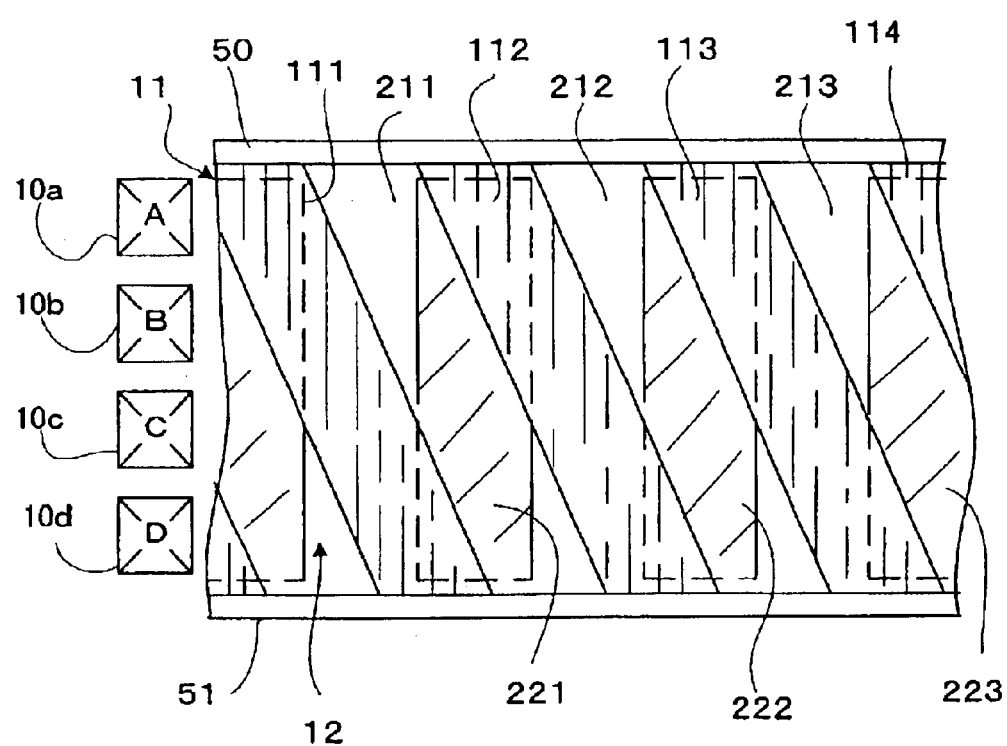
FIG. 15B is a schematic developed view of the detection apparatus shown in FIG. 15A.

FIGS. 15A and 15B show still another embodiment of the present invention; specifically, FIG. 15A is a schematic perspective view of the relative-rotational-position detection apparatus, and FIG. 15B is a developed view of the outer and inner cylindrical sections 11 and 12. In the instant embodiment, the outer cylindrical section 11 has, at its opposite axial ends, rims 50 and 51 formed, for example, of a nonmagnetic and nonconductive plastic substance, and there is formed no ring of the conductive substance along the rims 50 and 51. For example, in the illustrated example of FIG. 1, the outer cylindrical section 11 has the plurality of open windows 21a to 21d formed in the conductive cylinder as described above. This arrangement of FIG. 1 leaves a ring of the conductive substance at the opposite axial ends, and the ring of the conductive substance acts as a simple one-turn coil which would create undesired phenomena, such as electric current flow therethrough, that adversely influences the detection accuracy. By contrast, if the relative-rotational-position detection apparatus is arranged as an assembled structure as in the example of FIG. 15 where the rims 50 and 51 formed of a nonmagnetic and nonconductive plastic material are provided, at the opposite axial ends of the outer cylindrical section 11, to clasp or hold together respective ends of a plurality of conductive bands 111, 112, 113, 114, . . . in such a manner as to eliminate rings of the conductive substance along the rims 50 and 51, it is possible to avoid formation of rings of the conductive substance at the opposite axial ends of the outer cylindrical section 11; as a consequence, the embodiment can effectively prevent the above-mentioned inconveniences. Note that the coil section 10 in the embodiment of FIG. 15 may be constructed in the same manner as in the embodiment of FIG. 1.

As illustratively shown in FIG. 15B, the plurality of conductive bands 111, 112, 113, 114, . . . each extend obliquely with respect to the axis of the outer cylindrical section 11, and gaps between these conductive bands 111, 112, 113, 114, . . . function as open windows 211, 212, 213, . . . . In this case, the open windows 211, 212, 213, . . . are not separated from each other in corresponding relation to tracks A–D, and these open windows 211, 212, 213, . . . extend obliquely with respect to the axis and function as open windows corresponding to tracks A–D in respective positions corresponding to tracks A–D. Therefore, in the outer cylindrical section 11 of this embodiment, there is formed no ring of the conductive substance even in intermediate portions other than the end rims 50 and 51. This arrangement too achieves enhanced detecting accuracy.

In the inner cylindrical section 12 of this embodiment, nonmagnetic windows 221, 222, 223, . . . extend parallel to the axis in such a manner that nonmagnetic windows corresponding to tracks A–D are provided in a same position relative to tracks A–D. For enhanced detecting accuracy in the inner cylindrical section 12 too, it is preferable, but not necessarily essential, that the nonmagnetic windows be provided as illustrated with no ring-shaped conductive portion being formed on the inner cylindrical section 12. Because the nonmagnetic windows can be formed by surface processing such as plating or etching, it is not necessary for the inner cylindrical section 12 to have clasp members corresponding to the rims 50 and 51 of the outer cylindrical section 11 constructed as an assembled structure. However, the inner cylindrical section 12 may also be constructed as an assembled structure having rims at opposite axial ends thereof, as necessary.

In the illustrated example, the degree of the overlap between the open windows 211, 212, 213, . . . of the outer cylindrical section 11 and the nonmagnetic windows 221, 222, 223 of the inner cylindrical section 12 is the greatest on track A corresponding to the coil 10a, and the smallest on track C corresponding to the coil 10c. Thus, assuming that track A corresponding to the coil 10a represents the sine phase, track C corresponding to the coil 10c represents the minus-sine phase. Further, on track B corresponding to the coil 10b, the degree of the overlap between the open windows 211, 212, 213, . . . of the outer cylindrical section 11 and the nonmagnetic windows 221, 222, 223 of the inner cylindrical section 12 is "½", which represents the cosine phase. Further, on track D corresponding to the coil 10d, the degree of the overlap between the open windows 211, 212, 213, . . . of the outer cylindrical section 11 and the nonmagnetic windows 221, 222, 223 of the inner cylindrical section 12 is "½", which represents the minus-cosine phase.

Whereas, in the illustrated example of FIG. 15, the open windows 211, 212, . . . of the outer cylindrical section 11 are formed to extend obliquely with respect to the axis, the present invention is not so limited; for example, the nonmagnetic windows 221, 222, . . . of the inner cylindrical section 12 may be formed to extend obliquely with respect to the axis. In another alternative, the open windows 211, 212, . . . and the nonmagnetic windows 221, 222, . . . may be formed to extend obliquely with respect to the axis in opposite directions. Inclination angle, of the open windows 211, 212, . . . , with respect to the axis and the like may be chosen as desired. What is essential here is that the respective impedance of the coils 10a to 10d varies with functional characteristics of sine, cosine, minus sine and minus cosine within a predetermined range (less than 90 degrees) in response to a variation in a relative rotational position to be detected within a predetermined range. Electric circuitry associated with the coils 10a to 10d in the embodiment of FIG. 15 may be constructed in a similar manner to the above-described.

FIGS. 16A and 16B and FIGS. 17A and 17B show still other embodiments of the present invention, which are constructed to form no ring of a conductive substance on the outer cylindrical section 11 similarly to the embodiment of FIGS. 15A and 15B. The embodiments of FIGS. 16A and 16B and FIGS. 17A and 17B are different from the embodiment of FIGS. 15A and 15B in that the outer cylindrical section 11 have no open window.

First, the embodiment shown in FIGS. 16A and 16B is described. FIG. 16A is a schematic developed view of the outer cylindrical section 11, and FIG. 16B is a schematic developed view of the inner cylindrical section 12 corresponding to the outer cylindrical section 11. In the instant embodiment of the detection apparatus too, the outer cylindrical section 11 is coupled with one of the relatively-rotatable first and second shafts 1 and 2 (e.g., first shaft 1) for rotation with the one shaft 1, while the inner cylindrical section 12 is connected to the other of the first and second shafts 1 and 2 (e.g., second shaft 2) for rotation with the other shaft 2. Thus, the circumferential relative positional relationship between the outer cylindrical section 11 and the inner cylindrical section 12 changes as the relative rotational position between the first and second shafts changes. Coil section 10 having four coils 10a, 10b, 10c and 10d is wound around the outer circumference of the outer cylindrical section 11 in a non-contact fashion, although illustration of a general external appearance view of the detection apparatus is omitted.

The outer cylindrical section 11 illustrated in FIG. 16A includes a cylindrical base 110 of a relatively small wall thickness that is formed of a nonmagnetic and nonconductive or poorly-conductive (i.e., non-magnetism-responsive) substance, such as SUS316 stainless steel, and rectangular magnetic shielding (antimagnetic) substance portions 115a, 115b, 115c, . . . , each having a predetermined width (w'), arranged on a surface of the cylindrical base 110 and circumferentially spaced apart from each other by a predetermined interval substantially equal to the above-mentioned dimension or width w. As an example, the magnetic shielding substance portions 115a, 115b, 115c, . . . are secured on the surface of the cylindrical base 110 by plating (e.g., copper plating); such plating is advantageous in terms of processing conveniences. Portions 116a, 116b, 116c, . . . , where the magnetic shielding (antimagnetic) substance portions 115a, 115b, 115c, . . . are not provided (i.e. which lie between the magnetic shielding (antimagnetic) substance forming the portions 115a, 115b, 115c, . . . ), correspond in function to the above-described open windows. Because the portions 116a, 116b, 116c, . . . do not present magnetic shielding (antimagnetic) characteristics, they allow the magnetic fields, produced by the coil section 10, to locally act on the inner cylindrical section 12 located inwardly of the outer cylindrical section 11. The portions 116a, 116b, 116c, . . . , which do not present magnetic shielding characteristics and therefore may be called non-magnetically-shielding portions, each have a width substantially equal to the width w. Note that the width w' is slightly greater than the width w.

The inner cylindrical section 12 of FIG. 16B is a cylindrical magnetic section having a suitable wall thickness and formed of a ferromagnetic substance, such as iron or ferrite. In the inner cylindrical section 12, there are formed a plurality of through openings 120a, 120b, 120c, . . . , each of which is in the shape of a parallelogram having a width in the circumferential direction that is equal to about 2w (i.e., about twice as great as the above-mentioned width w). Namely, these through openings 120a, 120b, 120c, . . . function as nonmagnetic windows in the inner cylindrical section 12. Further, in opposite end edges of the inner cylindrical section 12, there are formed recesses 121a, 121b, 121c, 121e, . . . each having an inclined surface substantially parallel to inclined edges of the openings 120a, 120b, 120c, . . . . Thus, magnetic portions 122 and 123 remaining on the inner cylindrical section 12 repeat patterns inclined or oblique to the circumference of the inner cylindrical section 12, as depicted by hatching.

In the embodiment of FIGS. 16A and 16B, the coils 10a, 10b, 10c and 10d in the coil section 10 are arranged as follows. The coils 10a and 10c are positioned adjacent to each other in correspondence with the oblique patterns of the magnetic portions 122 on one of the edges of the inner cylindrical section 12, so that the outputs of the coils 10a and 10c are synthesized differentially (push-pull synthesis) in a similar manner to the example of FIG. 4 and there can be provided an output signal equivalent to "sin θ sin ωt". Further, the coils 10b and 10d are positioned adjacent to each other in correspondence with the oblique patterns of the magnetic portions 123 on the other edge of the inner cylindrical section 12, so that the outputs of the coils 10b and 10d are synthesized differentially (push-pull synthesis) in a similar manner to the example of FIG. 4 and there can be provided an output signal equivalent to "cos θ sin ωt".

As in each of the above-described embodiments, the outer cylindrical section 11 is magnetically shielded where the magnetic shielding (antimagnetic) substance portions 115a, 115b, 115c, . . . are provided, so that the presence of the magnetic portions 122 and 123 of the inner cylindrical section 12 located inwardly of the magnetic shielding (antimagnetic) substance portions is practically canceled, and only the magnetic portions 122 and 123, corresponding to (located inwardly of) the non-magnetically-shielding portions 116a, 116b, 116c, . . . (functioning like the open windows) in the outer cylindrical section 11, are magnetically coupled with the individual coils 10a to 10d of the coil section 10. Then, the relative rotational position (relative position in the circumferential direction) between the outer and inner cylindrical sections 11 and 12 varies as the relative rotational position between the shafts 1 and 2 changes, as set forth above, in response to which the correspondency between the non-magnetically-shielding portions 116a, 116b, 116c, . . . of the outer cylindrical section 11 and the magnetic portions 122 and 123 of the inner cylindrical section 12 changes to cause variations in the impedance of the coils 10a to 10d.

Let it be assumed that the circumferential relative displacement between the outer and inner cylindrical sections 11 and 12 in this embodiment is limited to a range substantially equal to the width w. If the width w is, for example, set to correspond to a rotational angle of ten-odd degrees at the most, the instant embodiment can function satisfactorily as a shaft torque sensor. Namely, in response to a variation, within the range of the width w, in the circumferential relative position between the outer and inner cylindrical sections 11 and 12, the impedance of the coils 10a and 10c changes differentially, and the impedance of the coils 10b and 10d changes differentially in different phases from the coils 10a and 10c. Namely, in a manner similar to the above-described, the width w can be set appropriately such that, within a range less than about 90 degrees, the coil 10a presents an impedance variation of sin θ, the coil 10c presents an impedance variation of minus sin θ, the coil 10b presents an impedance variation of cos and the coil 10d presents an impedance variation of minus cos θ. Because the instant embodiment has no conductive ring formed on the outer periphery of the non-magnetically-shielding portions 116a, 116b, 116c, . . . of the outer cylindrical section 11 as in the embodiment of FIGS. 15A and 15B, it can avoid undesired losses and therefore achieve a good detection accuracy.

Figure 17A:
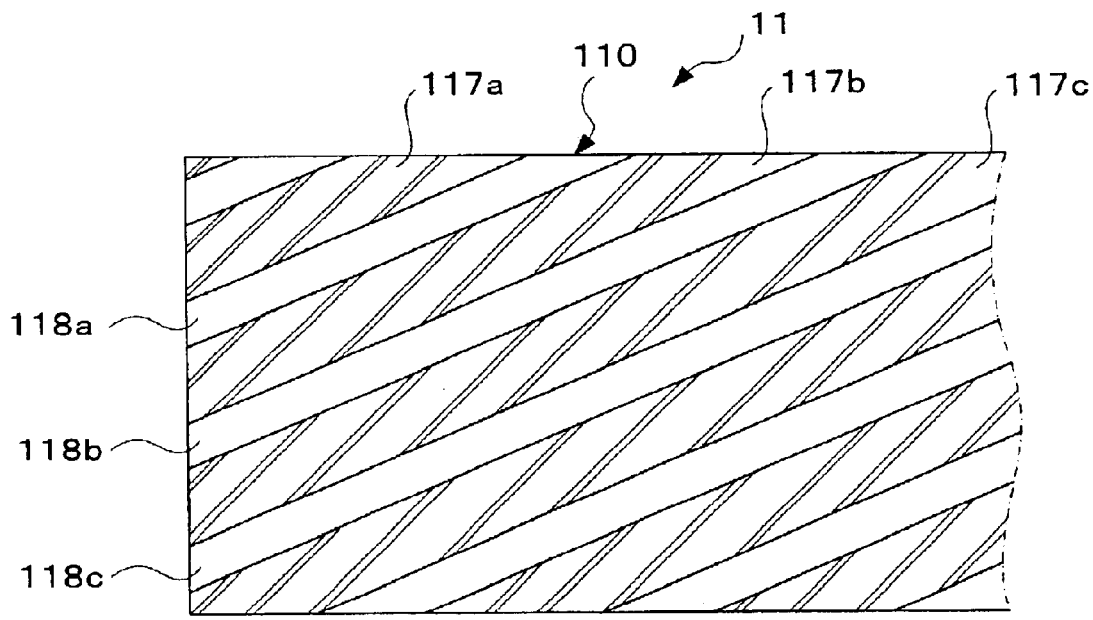
FIG. 17A is a developed view of an outer cylindrical section in still another embodiment of the present invention.
Figure 17B:
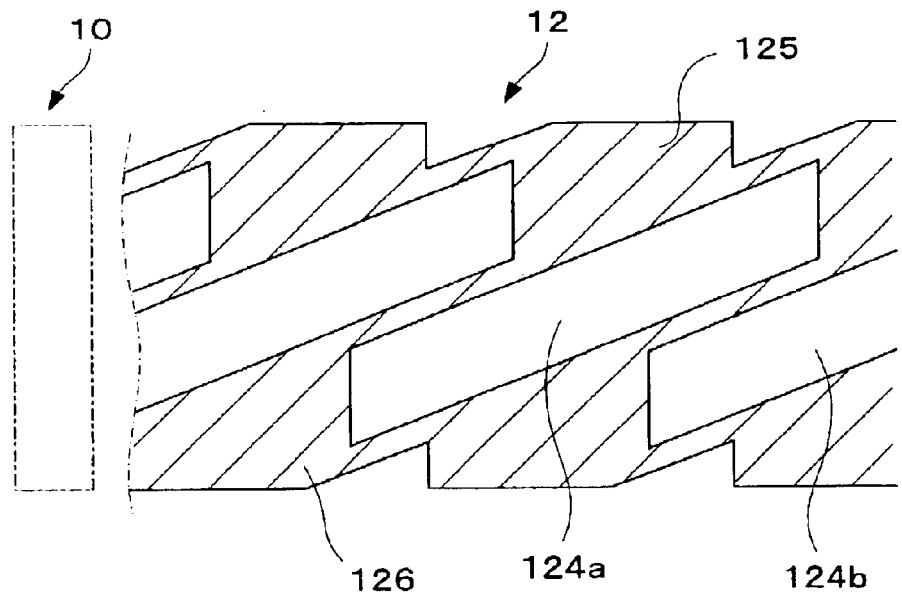
FIG. 17B is a developed view of an inner cylindrical section corresponding to the outer cylindrical section.

The following paragraphs describe still another embodiment shown in FIGS. 17A and 17B. FIG. 17A is a developed view of the outer cylindrical section 11, while FIG. 17B is a developed view of the inner cylindrical section 12 corresponding to the outer cylindrical section 11. In the instant embodiment of the detection apparatus too, the outer cylindrical section 11 is coupled with one of the relatively-rotatable first and second shafts 1 and 2 (e.g., first shaft 1 ) for rotation with the one shaft 1, while the inner cylindrical section 12 is connected to the other of the first and second shafts 1 and 2 (e.g., second shaft 2 ) for rotation with the other shaft 2. Thus, the circumferential relative positional relationship between the outer cylindrical section 11 and the inner cylindrical section 12 changes as the relative rotational position between the first and second shafts changes. Coil section 10 having four coils 10a, 10b, 10c and 10d is wound around the outer circumference of the outer cylindrical section 11 in a non-contact fashion, although illustration of a general external appearance view of the detection apparatus is omitted.

In the embodiment of FIG. 17A, the outer cylindrical section 11 has a cylindrical base 110 formed of the same material as the counterpart of FIG. 16A. The outer cylindrical section 11 of FIG. 17A is different from the outer cylindrical section 11 of FIG. 16A in that patterns of magnetic-shielding (antimagnetic) substance portions 117a, 117b, 117c, ..., formed, for example, of copper plating, are provided obliquely to the circumference of the outer cylindrical section 11. Therefore, non-magnetically-shielding portions 118a, 118b, 118c, ..., which correspond in function to the above-mentioned open windows, are also provided obliquely to the circumference of the outer cylindrical section 11. The inner cylindrical section 12 of FIG. 17B is also a cylindrical magnetic section having a suitable wall thickness and formed of a ferromagnetic substance, such as iron or ferrite, as in the other embodiments described above. In the inner cylindrical section 12, there are formed a plurality of through openings 124a, 124b, 124c, ..., each of which is in the shape of a parallelogram and corresponds in function to the open windows. As depicted by hatching, magnetic portions 125 and 126 remaining on the inner cylindrical section 12 repeat patterns oblique to the circumferential direction so as to correspond to the oblique non-magnetically-shielding portions 118a, 118b, 118c, .... In the embodiment of FIGS. 17A and 17B too, the coils 10a–10d of the coil section 10 are arranged such that the coils 10a and 10c present differential impedance variations like sine and –sin θ and the coils 10b and 10d present differential impedance variations like cos θ and –cos θ. Because the instant embodiment too has no conductive ring formed on the outer periphery of the non-magnetically-shielding portions 118a, 118b, 118c, ... of the outer cylindrical section 11, it can effectively avoid undesired losses and therefore achieve a good detection accuracy.

Electric circuitry associated with the coils 10a to 10d in the embodiment of FIGS. 16A–17B may be constructed in a similar manner to the above-described.

Whereas the number of the tracks in the above-described embodiments of FIGS. 1, 8, 15A–17B, etc. is four, there may be provided five or more tracks.

Further, it should be apparent that the arrangement employed in the embodiment of FIGS. 15A–17B for not forming rings of the conductive substance on the outer and inner cylindrical sections 11 and 12 may be applied not only to the four-track type construction but also to the two-track type construction as shown in FIG. 11 or 13.

In summary, the relative-rotational-position detection apparatus of the present invention is characterized by the provision of four detecting channels each comprising a combination of the relatively-displaceable open window and nonmagnetic window. Thus, the present invention permits accurate detection by appropriately compensating temperature drift characteristics, and it can be constructed to provide dual detection outputs for increased safety. Further, the relative-rotational-position detection apparatus of the present invention can be constructed for use in either the phase detection scheme or the voltage detection scheme, and thus achieves good usability or enhanced convenience of use. Particularly, in the case where the invention is used in the phase detection scheme, it can effectively avoid temperature drift errors not only in the coil impedance but also in core loss or eddy current loss.

What is claimed is:

1. A relative-rotational-position detection apparatus for detecting a relative rotational position between a first shaft and a second shaft rotatable relative to each other, which comprises:

an outer cylindrical section rotatable with said first shaft, said outer cylindrical having a nonmagnetic and non-conductive cylindrical base and magnetic shielding portions that are formed of a magnetic shielding or antimagnetic substance and arranged on a surface of the cylindrical base, the magnetic shielding portions being spaced apart from each other by a predetermined interval in a circumferential direction of the cylindrical base so that non-magnetically-shielding portions are formed between the magnetic shielding portions;

a plurality of coils provided on a periphery of said outer cylindrical section and excitable by a predetermined A.C. signal; and an inner cylindrical section inserted in said outer cylindrical section and rotatable with said second shaft, said inner cylindrical section including magnetic portions each provided to present a different characteristic with respect to an arrangement of said plurality of coils;

wherein a degree of overlap between the non-magnetically-shielding portions of said outer cylindrical section and the magnetic portions of said inner cylindrical section varies in response to a variation in a relative rotational position between said first shaft and said second shaft, each of said coils presenting a different impedance corresponding to said degree of overlap.

2. A relative-rotational-position detection apparatus as claimed in claim 1 wherein the impedance of first and second coils among said plurality of coils varies differentially and a first A.C. output signal is generated by obtaining a different between outputs of said first and second coils, the impedance of third and fourth coils among said plurality of coils varies differentially and a second A.C. output signal is generated by obtaining a different between outputs of said third and fourth coils, and arrangements of the magnetic shielding portions of said outer cylindrical section and the magnetic portions of said inner cylindrical section are set such that amplitudes of said first A.C. output signal and said second A.C. output signal vary with predetermined different characteristics in accordance with the variation in the relative rotational position.

3. A relative-rotational-position detection apparatus as claimed in claim 2 wherein the arrangements are set in such a manner that the amplitudes of said first and second A.C. output signals vary with opposite characteristics in accordance with the variation in the relative rotational position over a predetermined range.

4. A relative-rotational-position detection apparatus as claimed in claim 2 which further comprises a first circuit for synthesizing said first and second A.C. output signals to thereby generate an A.C. signal representative of a phase corresponding to the relative rotational position, and a second circuit for selecting one of said first and second A.C. output signals, and wherein the relative rotational position can be detected either on the basis of the A.C. signal representative of a phase corresponding to the relative rotational position obtained by said first circuit or on the basis of an amplitude level of the one of said first and second A.C. output signals selected by said second circuit.

5. A relative-rotational-position detection apparatus as claimed in claim 4 wherein, when one of said first and second A.C. output signals has an anomaly, said second circuit selects other of said first and second A.C. output signals having no anomaly so that the relative rotational position can be detected on the basis of the amplitude level of the A.C. output signal selected by said second circuit.

6. A relative-rotational-position detection apparatus as claimed in claim 1 wherein the impedance of first and second coils among said plurality of coils varies differentially and a first A.C. output signal is generated by obtaining a ratio between outputs of said first and second coils, the impedance of third and fourth coils among said plurality of coils varies differentially and a second A.C. output signal is generated by obtaining a ratio between outputs of said third and fourth coils, and arrangements of the magnetic shielding portions of said outer cylindrical section and the magnetic portions of said inner cylindrical section are set such that amplitudes of said first A.C. output signal and said second A.C. output signal vary with predetermined different characteristics in accordance with the variation in the relative rotational position.

7. A relative-rotational-position detection apparatus as claimed in claim 1 wherein said first and second shafts are interconnected via a torsion bar so that said relative-rotational-position detection apparatus functions as a torque sensor for detecting torque applied to said torsion bar by detecting an amount of torsion between said first and second shafts as the relative rotational position.

8. A relative-rotational-position detection apparatus as claimed in claim 1 wherein said plurality of coils are disposed in a ring-like configuration around an outer periphery of said outer cylindrical section.

9. A relative-rotational-position detection apparatus as claimed in claim 1 which is suitable for use as a torque sensor for detecting torque applied to a power steering shaft of a motor vehicle.

* * * * *

UNITED STATES PATENT AND TRADEMARK OFFICE
CERTIFICATE OF CORRECTION

PATENT NO. : 6,823,745 B2
DATED : November 30, 2004
INVENTOR(S) : Atsutoshi Goto et al.

It is certified that error appears in the above-identified patent and that said Letters Patent is hereby corrected as shown below:

<u>Title page,</u>
Insert Item:
-- [30]  Foreign Application Priority Data
      Apr. 11, 2001  (JP)...............2001-113326 --

Signed and Sealed this

First Day of March, 2005

JON W. DUDAS
*Director of the United States Patent and Trademark Office*